US012510779B2

(12) United States Patent
Sharma et al.

(10) Patent No.: US 12,510,779 B2
(45) Date of Patent: Dec. 30, 2025

(54) OPTICAL CONSTRUCTION INCLUDING LENS FILM AND MULTILAYER MASK

(71) Applicant: 3M INNOVATIVE PROPERTIES COMPANY, St. Paul, MN (US)

(72) Inventors: Neeraj Sharma, Lake Elmo, MN (US); Przemyslaw P. Markowicz, Woodbury, MN (US); Daniel J. Schmidt, Woodbury, MN (US); Timothy J. Reddy, Maplewood, MN (US); Mark A. Roehrig, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 353 days.

(21) Appl. No.: 18/265,742

(22) PCT Filed: Dec. 14, 2021

(86) PCT No.: PCT/IB2021/061728
§ 371 (c)(1),
(2) Date: Jun. 7, 2023

(87) PCT Pub. No.: WO2022/130218
PCT Pub. Date: Jun. 23, 2022

(65) Prior Publication Data
US 2024/0045115 A1    Feb. 8, 2024

Related U.S. Application Data

(60) Provisional application No. 63/127,289, filed on Dec. 18, 2020.

(51) Int. Cl.
*G02F 1/1335*    (2006.01)
*G02B 1/04*    (2006.01)
(Continued)

(52) U.S. Cl.
CPC ....... *G02F 1/133526* (2013.01); *G02B 1/041* (2013.01); *G02B 3/0012* (2013.01); *G02B 3/0056* (2013.01); *G02B 27/0988* (2013.01)

(58) Field of Classification Search
USPC .......................................... 359/642
See application file for complete search history.

(56) References Cited

U.S. PATENT DOCUMENTS 5,175,030 A    12/1992 Lu et al.
5,183,597 A    2/1993 Lu
(Continued)

FOREIGN PATENT DOCUMENTS

JP    2007047216 A    2/2007
JP    2007187759 A    7/2007
(Continued)

OTHER PUBLICATIONS

International Search Report for PCT International Application No. PCT/IB2021/061728, mailed on Mar. 8, 2022, 3 pages.
(Continued)

*Primary Examiner* — Dung T Nguyen
(74) *Attorney, Agent, or Firm* — Christopher P. Tebow

(57) ABSTRACT

An optical construction includes a lens film having outermost first and second major surfaces. The first major surface includes a plurality of microlenses. A multilayer mask having an average thickness of less than about 0.5 times an average focal length of the microlenses and an optical density of greater than about 2 is disposed on the second major surface. The multilayer mask includes polymeric first and second mask layers where each of the first and second mask layers has an optical density of greater than about 0.3. The multilayer mask defines a plurality of laser-ablated through openings therein that are aligned to the microlenses in a one-to-one correspondence. An optical transmittance of
(Continued)

the optical construction as a function of the incident angle has a transmitted peak having a peak transmittance T1 and a corresponding full width at 20 percent of maximum W1, where T1/W1≥2.4%/degree.

14 Claims, 16 Drawing Sheets

(51) Int. Cl.
  *G02B 3/00*  (2006.01)
  *G02B 27/09*  (2006.01)

(56) References Cited

U.S. PATENT DOCUMENTS

| | | | |
|---|---|---|---|
| 5,712,731 A * | 1/1998 | Drinkwater | G02B 5/1885 359/623 |
| 7,864,450 B2 | 1/2011 | Segawa et al. | |
| 8,234,998 B2 | 8/2012 | Krogman et al. | |
| 9,919,339 B2 | 3/2018 | Johnson et al. | |
| 10,017,001 B2 * | 7/2018 | Chen-Ho | B42D 25/29 |
| 2007/0258149 A1 | 11/2007 | Gardner et al. | |
| 2012/0064296 A1 | 3/2012 | Walker, Jr. et al. | |
| 2013/0011608 A1 | 1/2013 | Wolk et al. | |
| 2013/0235614 A1 | 9/2013 | Wolk et al. | |
| 2021/0271003 A1 * | 9/2021 | Yang | G02B 3/0056 |

FOREIGN PATENT DOCUMENTS

| | | |
|---|---|---|
| JP | 2007264133 A | 10/2007 |
| WO | 2014099367 A1 | 6/2014 |
| WO | 2019135190 A1 | 7/2019 |
| WO | 2019186397 A1 | 10/2019 |
| WO | 2020016393 A1 | 1/2020 |
| WO | 2020035768 A1 | 2/2020 |
| WO | 2021111297 A1 | 6/2021 |
| WO | 2021205248 A1 | 10/2021 |
| WO | 2021255596 A1 | 12/2021 |
| WO | 2022058815 A1 | 3/2022 |
| WO | 2022130082 A1 | 6/2022 |
| WO | 2022130084 A1 | 6/2022 |
| WO | 2022130085 A1 | 6/2022 |

OTHER PUBLICATIONS

Krogman, "Automated Process for Improved Uniformity and Versatility of Layer-by-Layer Deposition", Langmuir, 2007, vol. 23, No. 06, pp. 3137-3141.

* cited by examiner

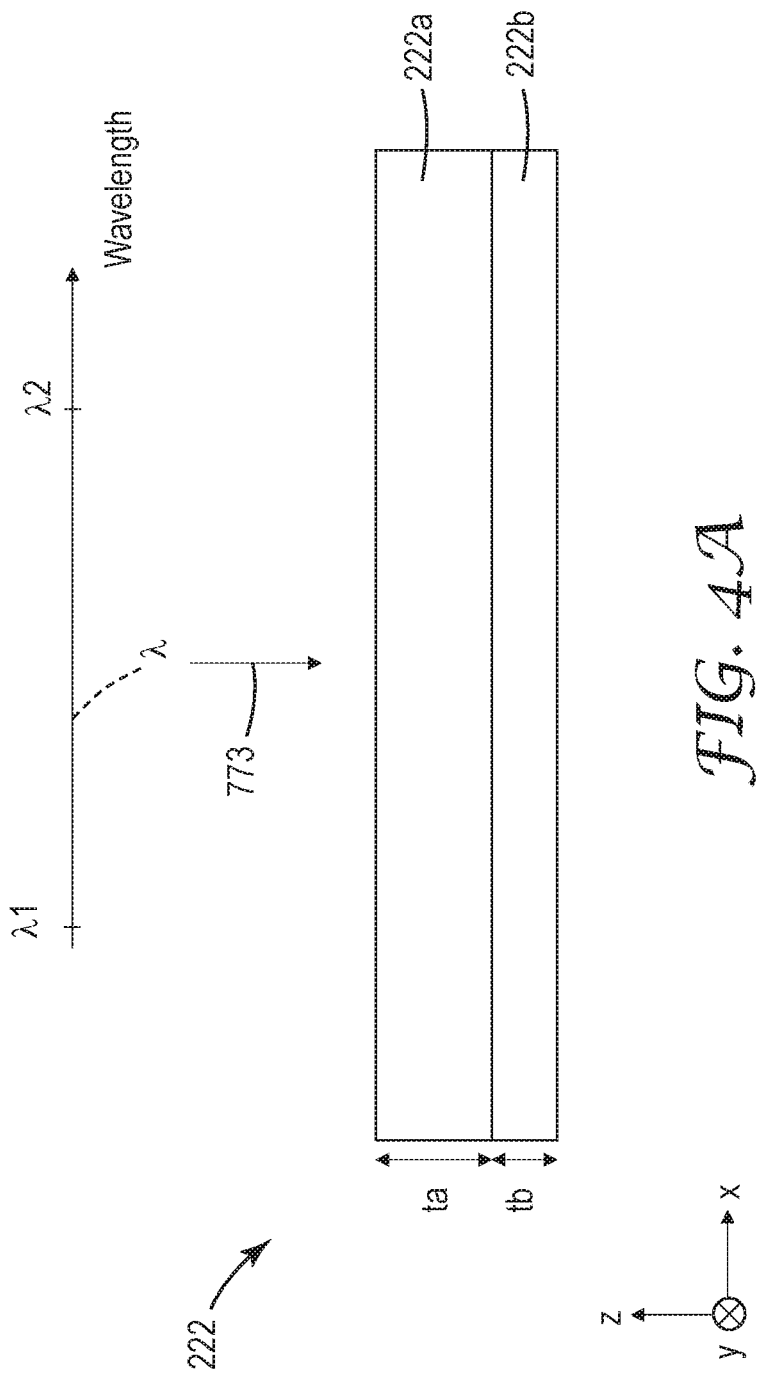

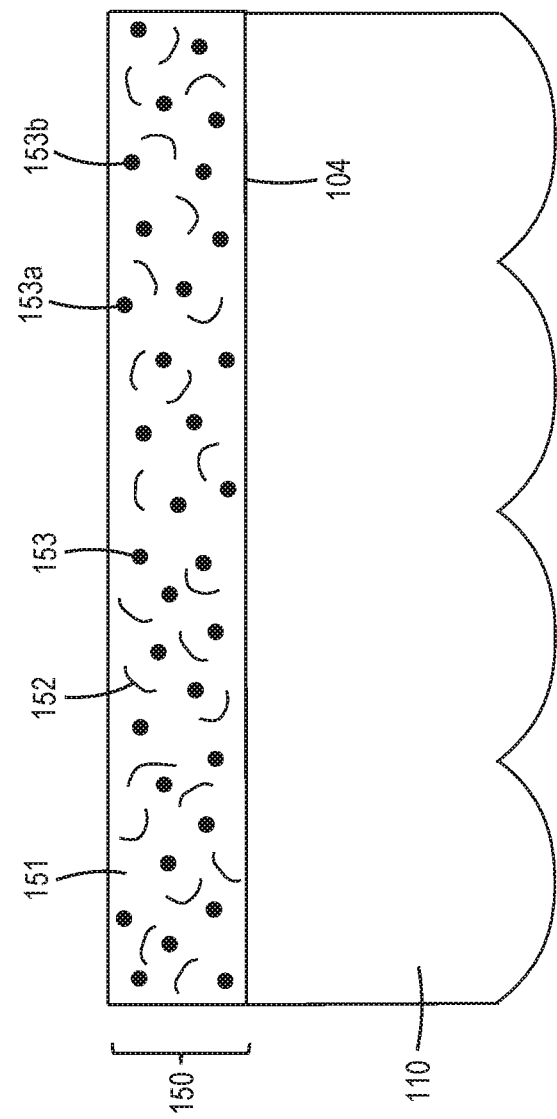

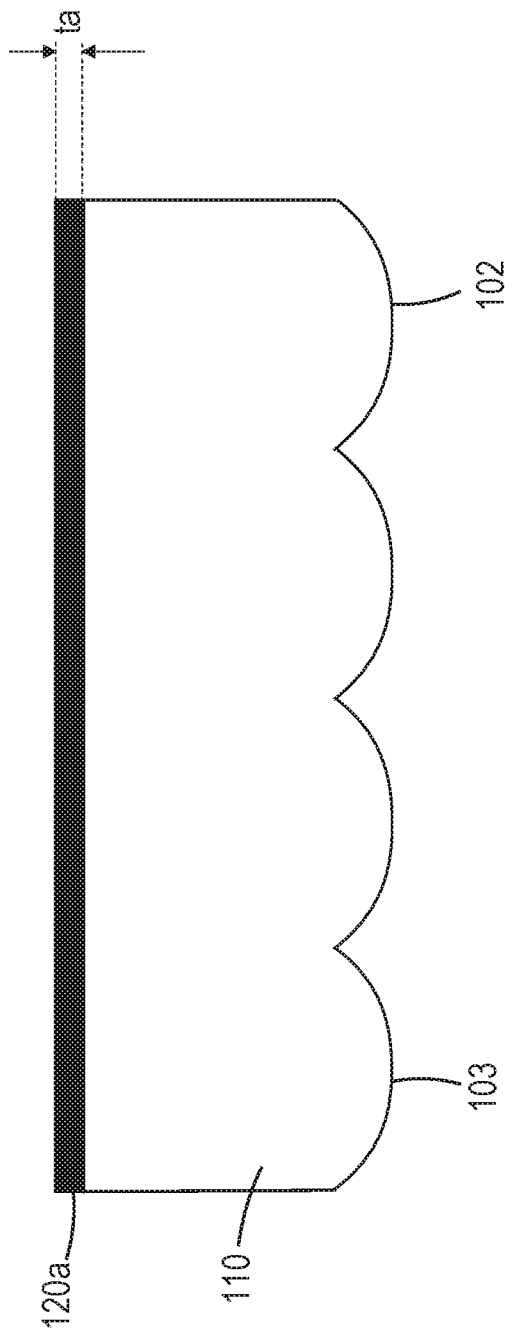

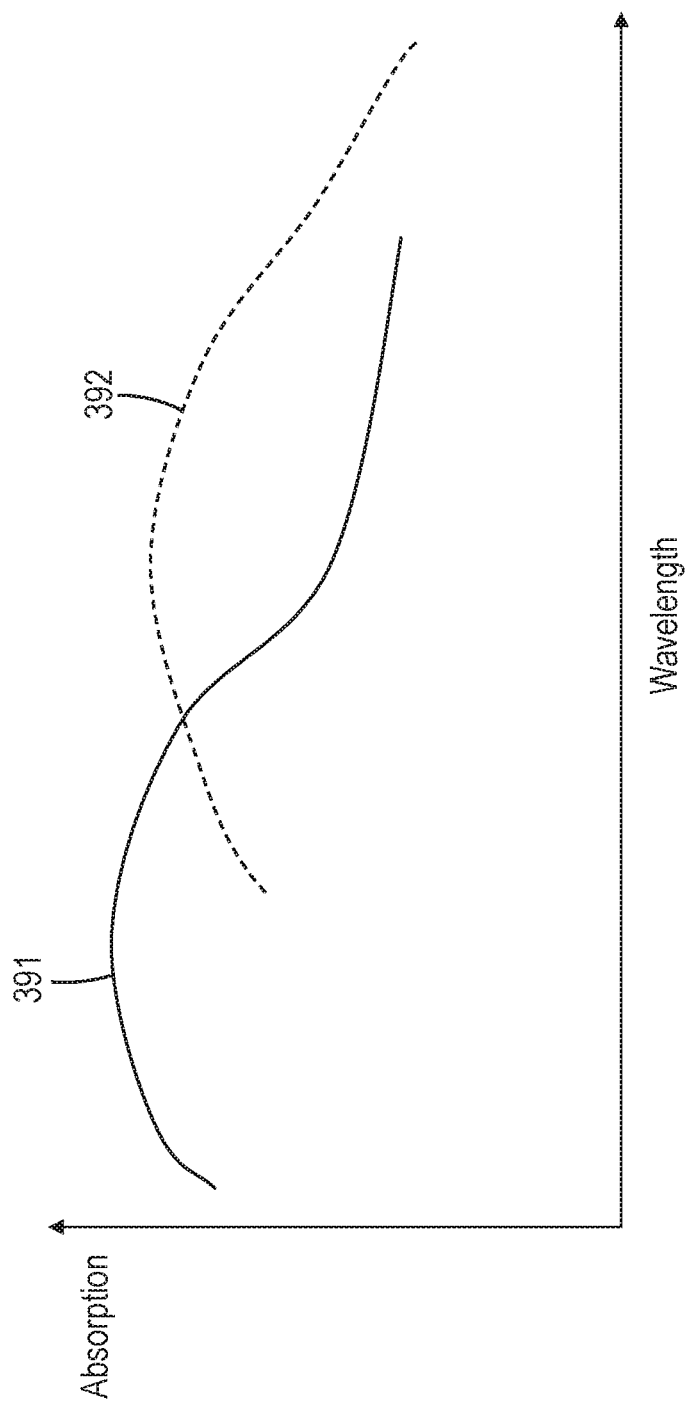

OPTICAL CONSTRUCTION INCLUDING LENS FILM AND MULTILAYER MASK

CROSS REFERENCE TO RELATED APPLICATIONS

This application is a national stage filing under 35 U.S.C. 371 of PCT/IB2021/061728, filed Dec. 14, 2021, which claims the benefit of U.S. Provisional Application No. 63/127,289, filed Dec. 18, 2020, the disclosures of which are incorporated by reference in their entireties herein.

BACKGROUND

An optical device can include a microlens array and a mask including an array of pinholes.

SUMMARY

The present description relates generally to optical constructions that include a multilayer mask and a lens film including a plurality of microlenses.

In some aspects of the present description, an optical construction is provided. The optical construction includes a lens film having an outermost structured first major surface and an opposing outermost substantially planar second major surface. The structured first major surface includes a plurality of microlenses arranged along orthogonal first and second directions. The optical construction includes a polymeric multilayer mask disposed on the second major surface of the lens film. The multilayer mask has an average thickness of less than about 0.5 times an average focal length of the microlenses and an optical density of greater than about 2. The multilayer mask includes polymeric first and second mask layers where each of the first and second mask layers has an optical density of greater than about 0.3. The multilayer mask defines a plurality of laser-ablated through openings therein arranged along the first and second directions. The through openings are aligned to the microlenses in a one-to-one correspondence, such that for substantially collimated light incident on the structured first major surface side of the optical construction along an incident direction forming an incident angle with the second major surface, an optical transmittance of the optical construction as a function of the incident angle has a first transmitted peak having a first peak transmittance T1 and a corresponding full width at 20 percent of maximum W1. T1/W1≥2.4%/degree.

In some aspects of the present description, an optical construction is provided. The optical construction includes a lens film having an outermost structured first major surface and an opposing outermost substantially planar second major surface. The structured first major surface includes a plurality of microlenses arranged along orthogonal first and second directions. The optical construction includes a polymeric multilayer mask disposed on the second major surface of the lens film. The multilayer mask has an average thickness of less than about 0.5 times an average focal length of the microlenses and an optical density of greater than about 2. The multilayer mask includes polymeric first and second mask layers where each of the first and second mask layers has an optical density of greater than about 0.3. The multilayer mask defines a plurality of laser-ablated through openings therein arranged along the first and second directions. The through openings are aligned to the microlenses in a one-to-one correspondence, such that for substantially collimated light incident on the structured first major surface side of the optical construction along an incident direction forming an incident angle with the second major surface, an optical transmittance of the optical construction as a function of the incident angle has a first transmitted peak having a first peak transmittance T1 and a second transmitted peak having a second peak transmittance T2. The second transmitted peak is the largest transmitted peak at an incident angle greater than an incident angle of the first transmitted peak by at least about 30 degrees and by no more than about 60 degrees. T2≤3% and T1/T2≥10.

In some aspects of the present description, an optical construction is provided. The optical construction includes a lens film having an outermost structured first major surface and an opposing outermost substantially planar second major surface. The structured first major surface includes a plurality of microlenses arranged along orthogonal first and second directions. The optical construction includes a multilayer mask disposed on the second major surface of the lens film. The multilayer mask has an average thickness of less than about 0.5 times an average focal length of the microlenses and an optical density of greater than about 2. The multilayer mask defines a plurality of laser-ablated through openings therein arranged along the first and second directions. The through openings are aligned to the microlenses in a one-to-one correspondence. The multilayer mask includes a polymeric first mask layer and a second mask layer including first and second materials including respective first and second binding groups where the first and second binding groups have complementary interactions. Each of the first and second mask layers has an optical density of greater than about 0.3.

In some aspects of the present description, an optical construction is provided. The optical construction includes a lens film having an outermost structured first major surface and an opposing outermost substantially planar second major surface. The structured first major surface includes a plurality of microlenses arranged along orthogonal first and second directions. The optical construction includes a polymeric multilayer mask disposed on the second major surface of the lens film. The multilayer mask has an average thickness of less than about 0.5 times an average focal length of the microlenses and an optical density of greater than about 2. The multilayer mask defines a plurality of laser-ablated through openings therein arranged along the first and second directions. The through openings are aligned to the microlenses in a one-to-one correspondence. The multilayer mask includes polymeric first and second mask layers where each of the first and second mask layers has an optical density of greater than about 0.3. The first mask layer is thicker than the second mask layer and the optical density of the second mask layer is greater than the optical density of the first mask layer.

These and other aspects will be apparent from the following detailed description. In no event, however, should this brief summary be construed to limit the claimable subject matter.

BRIEF DESCRIPTION OF THE DRAWINGS

FIGS. 4A-4B are schematic cross-sectional views of multilayer masks, according to some embodiments.

FIGS. 5A-5C schematically illustrate solvent deposition of a mask layer on a lens film, according to some embodiments.

FIG. 6 is a schematic plot of optical absorption versus wavelength, according to some embodiments.

DETAILED DESCRIPTION

Figure 1:
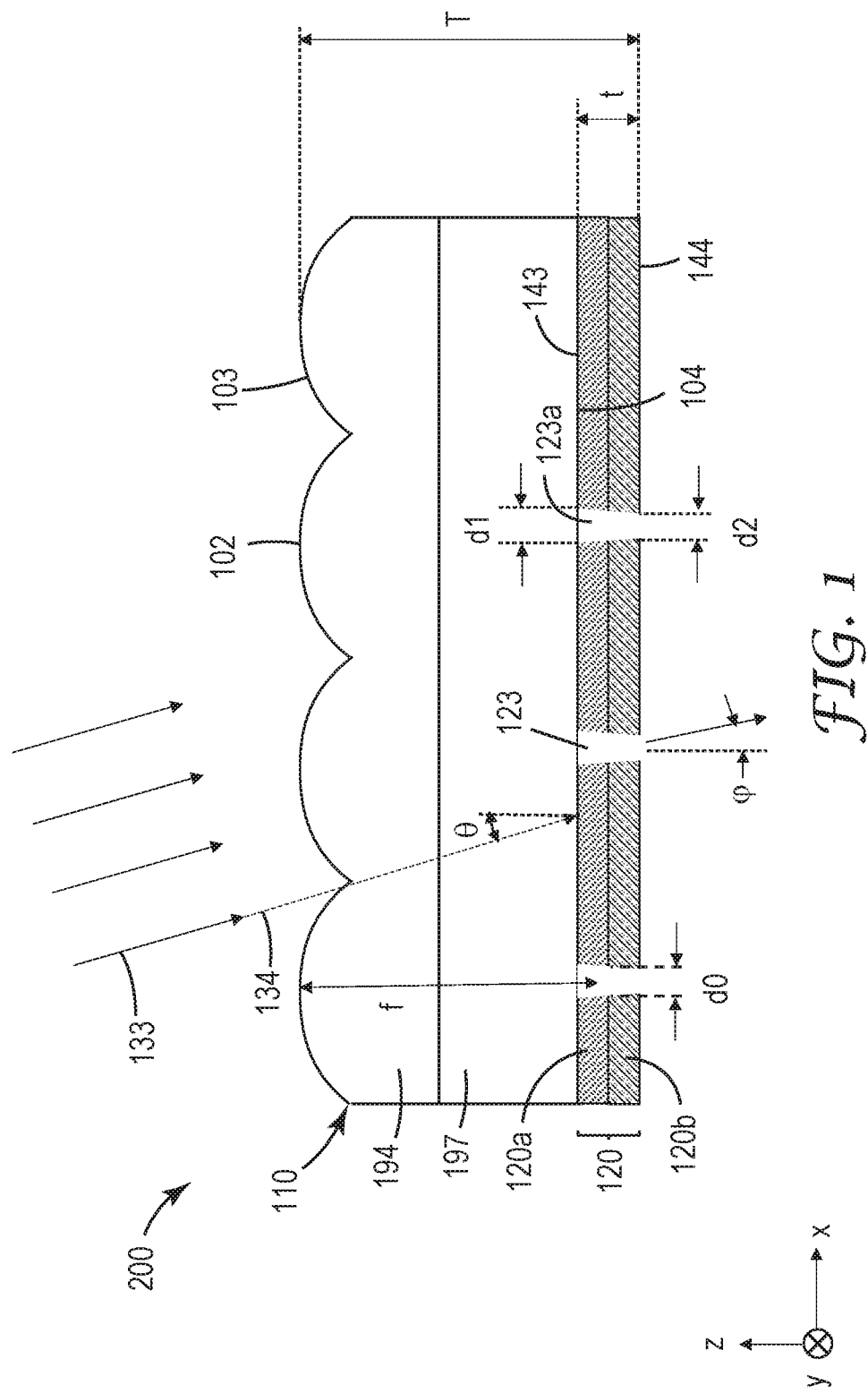
FIG. 1 is a schematic cross-sectional view of an optical construction, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

An optical construction can include a microlens array and a metal mask having an array of through openings (e.g., pinholes) corresponding to the microlenses. However, it has been found that using a metal mask can result in unwanted specular reflection from regions of the mask between through openings. A polymeric layer including optically absorptive material in place of a metal mask can be used. However, previous optical constructions using such polymeric layers have had through openings with poor shape definition which can result in undesirably broad peaks in optical transmittance through the through openings and/or can result in undesired cross-talk (e.g., light incident on one microlens may be transmitted through an adjacent through hole) and/or can result in undesirably low peak transmittance (unless large diameter through openings are used which would result in undesired cross-talk).

According to some embodiments of the present description, multilayer masks are provided which provide a sharp peak in optical transmittance through the optical construction. The multilayer mask can include a solvent-deposited mask layer and/or a coated and cured polymeric mask layer. A solvent-deposited mask layer is a mask layer formed by depositing (e.g., coating) materials (e.g., polymer and light absorbing materials) of the layer in a solvent and then evaporating the solvent. The multilayer mask can include a mask layer formed by layer-by-layer self-assembly of first and second materials having respective first and second binding groups with complementary interactions (e.g., electrostatic interactions between positively and negatively charged functional groups). For example, the first and second materials can be oppositely charged polymer and nanoparticles, respectively. After the multilayer mask has been formed, the through-holes can be formed in the multilayer mask by laser ablation.

It has been found that mask layers formed by layer-by-layer self-assembly (e.g., of oppositely charged polymer and nanoparticles) provides a desired increase in optical density with lower added thickness compared to simply increasing the thickness of a solvent-deposited or coated and cured polymeric mask layer, for example. However, it has been found that it is difficult to achieve a desired low cross-talk when only a mask layer formed by layer-by-layer self-assembly is used due to the difficulty in achieving a sufficient thickness of such a mask layer. According to some embodiments of the present description, a multilayer mask including a polymeric mask layer (e.g., a solvent-deposited or coated and cured polymeric layer) and a layer-by-layer self-assembled mask layer, for example, can achieve a high optical density (e.g., greater than about 2) and a desired overall thickness (e.g., about 1 micron to about 7 microns) resulting in low cross-talk. It has further been found, according to some embodiments, that solvent-deposited mask layers can provide improved through hole shape definition (and correspondingly lower cross-talk, for example) compared to polymeric mask layers formed by coating and curing, for example. In some embodiments, a multilayer mask includes a solvent-deposited mask layer and a mask layer formed via layer-by-layer self-assembly.

In some embodiments, the optical constructions are useful as angularly selective optical filters which can be used in a variety of applications such as fingerprint sensing applications, for example. In some embodiments, the optical construction may be disposed between a fingerprint sensing area and a sensor in a device (e.g., cell phone) and can be adapted to transmit light reflected from a finger in the fingerprint sensing area to the sensor while rejecting light incident on the optical construction from different angles.

FIG. 1 is a schematic cross-sectional view of an optical construction 200, according to some embodiments. The optical construction 200 includes a lens film 110 having an outermost structured first major surface 102 and an opposing outermost second major surface 104, and a multilayer mask 120 disposed on the second major surface 104 of the lens film 110. The structured first major surface 102 includes a plurality of microlenses 103 arranged along orthogonal first and second directions (e.g., x- and y-directions). The second major surface 104 may be substantially planar (e.g., planar or nominally planar or planar up to variations or curvature small compared to that of the structured first major surface 102). The multilayer mask 120 has an average thickness t of less than about 0.5 times an average focal length f of the microlenses and may have an optical density of greater than about 2. The multilayer mask 120 can include two or more mask layers. In some embodiments, the multilayer mask 120 includes polymeric mask layers 120a and 120b where each of the mask layers 120a and 120b may have an optical density of greater than about 0.3. Either one of the mask layers 120a and 120b may be referred to as a first mask layer and the other one of the mask layers 120a and 120b may be referred to as a second mask layer. In some embodiments, the first mask layer is a polymeric first mask layer (e.g., a solvent-deposited mask layer) and the second mask layer includes first and second materials having respective first and second binding groups where the first and second binding groups have complementary interactions (e.g., deposited via layer-by-layer self-assembly). The multilayer mask 120 defines a plurality of laser-ablated through openings 123 therein arranged along the first and second directions, where the through openings 123 are aligned to the microlenses in a one-to-one correspondence.

A microlens is generally a lens with at least two orthogonal dimensions (e.g., a height and a diameter, or a diameter along two axes) less than about 1 mm and greater than about 100 nm. The microlenses can have an average diameter in a range of about 0.5 microns to about 500 microns, or about 5 microns to about 100 microns, for example. The microlenses can have an average radius of curvature in a range of 5 microns to 50 microns, for example. The microlenses can have any suitable shape. The microlenses can be spherical or aspherical microlenses, for example. In some embodiments, the microlenses are pillow lenses which can allow for a higher fraction of the area covered by the lenses to be optically active, for example. A pillow lens may be substantially symmetric under reflection about two orthogonal planes (e.g., planes passing through a center of the lens and parallel to the x-z plane and the y-z plane, respectively), or about three planes parallel to the thickness direction of the lens film where each plane makes an angle of about 60 degrees with each other plane, without being rotationally symmetric about any axis.

The multilayer mask 120 can be a polymeric multilayer mask. A polymeric multilayer mask is a multilayer mask where each mask layer is polymeric. A polymeric layer includes an organic polymer extending substantially continuously across a length and width of the layer and may optionally include non-polymeric particles, for example, distributed in the polymer. For example, a pigment and/or dye filled polymer can be used to form a polymeric layer.

The multilayer mask 120 has opposing third and fourth major surfaces 143 and 144, where the third major surface 143 faces the lens film 110. The multilayer mask 120 has an average thickness t which may alternatively be described as the average separation between the third and fourth major surfaces 143 and 144. The average refers to the unweighted mean unless indicated differently. In some embodiments, the average thickness t is less than about 0.5, or less than about 0.4, or less than about 0.3 times the average focal length f, for example. In some such embodiments, or in other embodiments, the average thickness t is less than about 10 microns, or less than about 8 microns, or less than about 6 microns, or less than about 5 microns, or less than about 4 microns, for example. The average thickness t can be greater than about 1 micron, or greater than about 2 microns, or greater than about 2.5 microns, for example. The average thickness t can be in a range of about 1 micron to about 7 microns or about 2 microns to about 6 microns, for example. In some embodiments, a total thickness T of the lens film 110 and the multilayer mask 120 is no greater than about 100 microns (e.g., in a range of about 30 microns to about 100 microns). The lens film 110 can include a lens layer 194 cast and cured on a substrate layer 197, for example, so that the thickness of the lens film 110 is the thickness of the lens layer 194 and the substrate layer 197. The substrate layer 197 can be a polymeric film such as a polyethylene terephthalate (PET) film, for example. In some embodiments, the average focal length f is in a range of T−3t to T+2t, or in a range of T−2t to T+t or in a range of T−t to T, for example. Cast and cure processes are generally described in U.S. Pat. No. 5,175,030 (Lu et al.), U.S. Pat. No. 5,183,597 (Lu) and U.S. Pat. No. 9,919,339 (Johnson et al.), and in U.S. Pat. Appl. Publ. No. 2012/0064296 (Walker, J R. et al), for example. Such cast and cure processes may utilize an acrylate resin to form the microlenses.

In some embodiments, in at least a first cross-section of the outermost structured first major surface in a direction substantially orthogonal to the first and second directions and substantially bisecting a first opening 123a in the plurality of through openings 123, the first opening 123a has a larger first width d1 on a side of the multilayer mask 120 facing the lens film 110 and a smaller second width d2 on a side of the multilayer mask 120 facing away from the lens film 110. In other embodiments, the first width d1 is smaller than the second width d2. In some embodiments, d1 and d2 are about equal. The relative widths of d1 and d2 may depend on material choice for the multilayer mask and on laser ablation processing conditions. Adjusting shapes of through holes via laser processing conditions is generally described in in U.S. Pat. No. 7,864,450 (Segawa et al.), for example. In some embodiments, a ratio (d1/d2) of the first width d1 to the second width d2 is in a range of about 1.1 to about 2.

In some embodiments, the through openings 123 have an average diameter in a range of about 1 micron to about 10 microns, or about 2 microns to about 8 microns. The diameter d0 of a through opening can be understood to be the diameter of a cylinder having a length equal to the thickness t and having a volume equal to the volume of the through opening (e.g., the diameter d0 may be about equal to (d1+d2)/2 in FIG. 1). The average diameter is the diameter d0 averaged (unweighted mean) over the through openings. The average of d1 or the average of d2 may also or alternatively be specified. In some embodiments, for at least one of the third and fourth major surfaces 143 and 144, the open ends at the major surface have an average diameter in a range of about 1 micron to about 10 microns, or about 2 microns to about 8 microns. The diameter of an open end can be understood to be the diameter of a circle having a same area as the open end. The average diameter of the open ends is diameter averaged (unweighted mean) over the open ends. In some embodiments, $0.5 \le d/t \le 2$, where d is the average d0, d1, or d2 and t is the average thickness of the multilayer mask.

Figure 2:
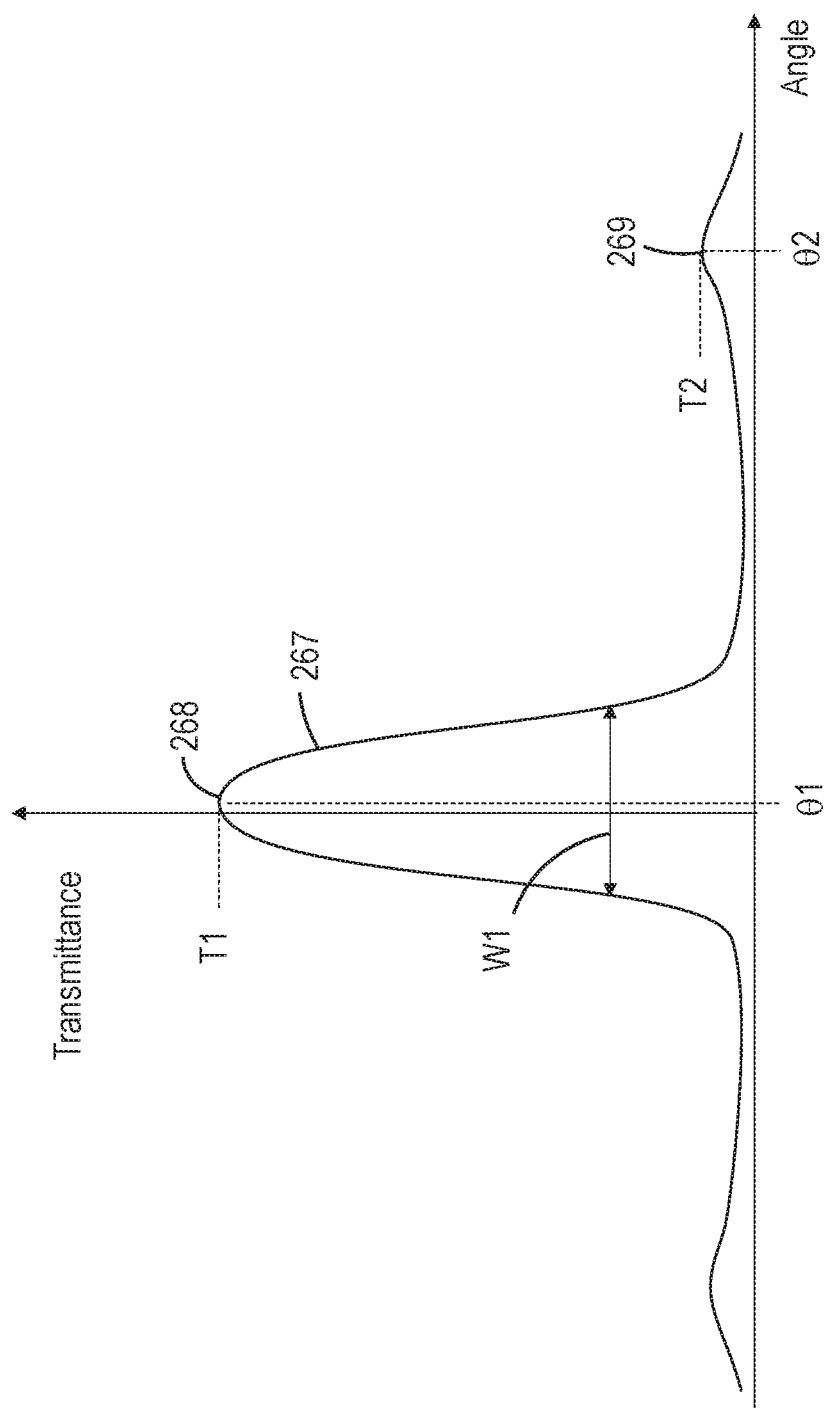
FIG. 2 is a schematic plot of optical transmittance of an optical construction as a function of an incident angle, according to some embodiments.

FIG. 2 is a schematic plot of optical transmittance 267 of an optical construction as a function of an incident angle, according to some embodiments. In some embodiments, the optical construction 200 is configured such that for a substantially collimated light 133 incident on the structured first major surface side of the optical construction along an incident direction 134 forming an incident angle $\theta$ with the second major surface 104, an optical transmittance 267 of the optical construction 200 as a function of the incident angle $\theta$ includes a first transmitted peak 268 having a first peak transmittance T1 and may include a corresponding full width at 20 percent of maximum W1. The optical transmittance may alternatively be expressed as a function of a transmitted angle $\varphi$. The substantially collimated light 133 can be collimated or nominally collimated or can have a divergence angle or convergence angle less than about 20 degrees, or less than about 10 degrees, or less than about 5 degrees, for example. The substantially collimated light 133 can fill or substantially fill at least one microlens or can fill or substantially fill a plurality of the microlenses. In some embodiments, $T1/W1 \ge 2.4\%$/degree, or $T1/W1 \ge 2.5\%$/degree, or $T1/W1 \ge 2.6\%$/degree, or $T1/W1 \ge 2.8\%$/degree, or $T1/W1 \ge 3\%$/degree, or $T1/W1 \ge 3.2\%$/degree, or $T1/W1 \ge 3.4\%$/degree. In some embodiments, the optical transmittance 267 has a full width at 20 percent of maximum W1 corresponding to the first transmitted peak 268 of less than about 20 degrees, or less than about 15 degrees, or less than about 12 degrees, or less than about 10 degrees.

It has been found that it is useful to characterize the optical transmittance in terms of the full width at 20 percent of maximum W1 rather than the full width at half maximum, for example, since a low full width at 20 percent of maximum W1 may correspond to improved optical properties (e.g., low cross-talk). It has been found that coated and cured single layer masks, for example, that can achieve about the same optical density as a multilayer mask described herein typically have a peak with a corresponding full width at half maximum (FWHM) and a corresponding full width at 20 percent maximum where the full width at 20 percent maximum is substantially greater than the FWHM and substantially greater than the full width at 20 percent maximum of the multilayer masks described herein, according to some embodiments.

In some embodiments, the optical transmittance 267 of the optical construction 200 as a function of an incident angle θ includes a first transmitted peak 268 having a first peak transmittance T1 and a second transmitted peak 269 having a second peak transmittance T2. In some embodiments, the second transmitted peak 269 is at an incident angle θ2 greater than the incident angle θ1 of the first transmitted peak 268 by at least about 30 degrees. The second transmitted peak can be the largest transmitted peak (i.e., the peak with the largest transmittance) for incident angles greater than the incident angle θ1 of the first transmitted peak 268 by at least about 30 degrees and by no more than about 60 degrees, for example. The transmitted angle θ2 will be understood to be greater than the incident angle θ1 of the first transmitted peak 268 by at least about 30 degrees and by no more than about 60 degrees when 102-011 is at least about 30 degrees and no more than about 60 degrees, regardless of the sign of θ2−θ1 since the coordinate system could be chosen to reverse the signs of θ2 and θ1. The second peak may result, at least in part, from shape variations in the microlenses arising the process (e.g., a cast and cure process) used to form the lens film, for example.

In some embodiments, $T2 \leq 3\%$, or $T2 \leq 2.5\%$, or $T2 \leq 2.3\%$, or $T2 \leq 2\%$, or $T2 \leq 1.5\%$, or $T2 \leq 1\%$, for example. In some such embodiments, or in other embodiments, $T1/T2 \geq 10$, or $T1/T2 \geq 12$, or $T1/T2 \geq 15$, or $T1/T2 \geq 18$, or $T1/T2 \geq 20$, for example. In some embodiments, T2 is at least about 0.1%, or at least about 0.25%, or at least about 0.5%. In some embodiments, $T1 \geq 15\%$, or $T1 \geq 20\%$, or $T1 \geq 25\%$, or $T1 \geq 30\%$, or $T1 \geq 35\%$, or $T1 \geq 40\%$. A higher T1 (e.g., $T1 \geq 35\%$, or $T1 \geq 40\%$) may be desired in some embodiments, while a higher optical density (e.g., greater than about 2.5) may be desired in some embodiments (e.g., to reduce cross-talk) and this may result in a lower (e.g., about 20% or about 25%), but still useful, T1.

Figure 9:
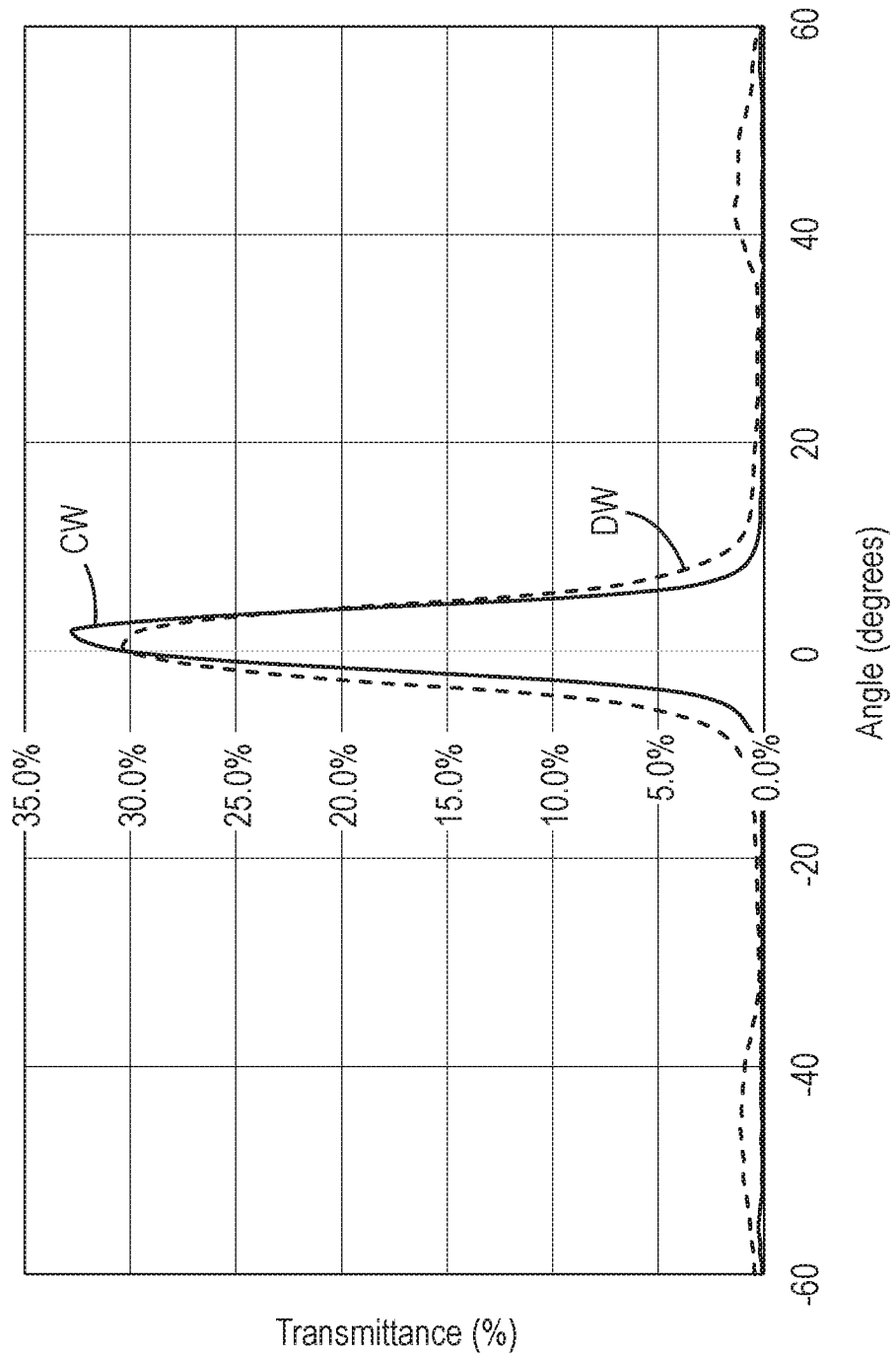
FIG. 9 is a plot of optical transmittance versus incident angle for an example optical construction.

An optical transmittance as a function of an incident angle can be determined for the incident angle along any in-plane direction (direction orthogonal to the thickness direction (z-direction) of the optical construction). An incident angle along an in-plane direction may alternatively be described as an incident angle defined in a plane containing the in-plane direction and the thickness direction. In FIG. 1, the incident angle θ is along the x-direction (or defined in the x-z plane). The optical transmittance as a function of an incident angle can depend on the in-plane direction chosen. For example, a plot of the optical transmittance as a function of the incident angle along an in-plane first direction (e.g., x-direction) may be different than a plot of the optical transmittance as a function of the incident angle in a different (e.g., different by 30 degrees or by 90 degrees) in-plane second direction (e.g., y-direction). For example, for a hexagonal array of microlenses, the plot may be the about same along directions between nearest neighbor microlenses that are at 60 degrees from one another, but different along other directions halfway between these directions. In embodiments where the lens film is fabricated in a roll-to-roll process, the first direction may be the cross-web direction and the second direction may be the down-web direction, for example. The second transmitted peak 269 may be present for the optical transmittance for incident angles along the down-web direction, but not for incident angles along the cross-web direction, for example (see, e.g., FIG. 9). A quantity such as T1, T2, W1, or T1/W1 may be described as satisfying a condition if the condition is satisfied for the optical transmittance as a function of incident angle along at least one in-plane direction. Any condition described herein for T1, T2, W1, or T1/W1 may hold for one in-plane direction, or for each of at least two non-co-linear in-plane directions (e.g., defining an angle therebetween of about 30 degrees or about 90 degrees), or for each of two orthogonal in-plane directions, or for all in-plane directions.

Figure 3A:
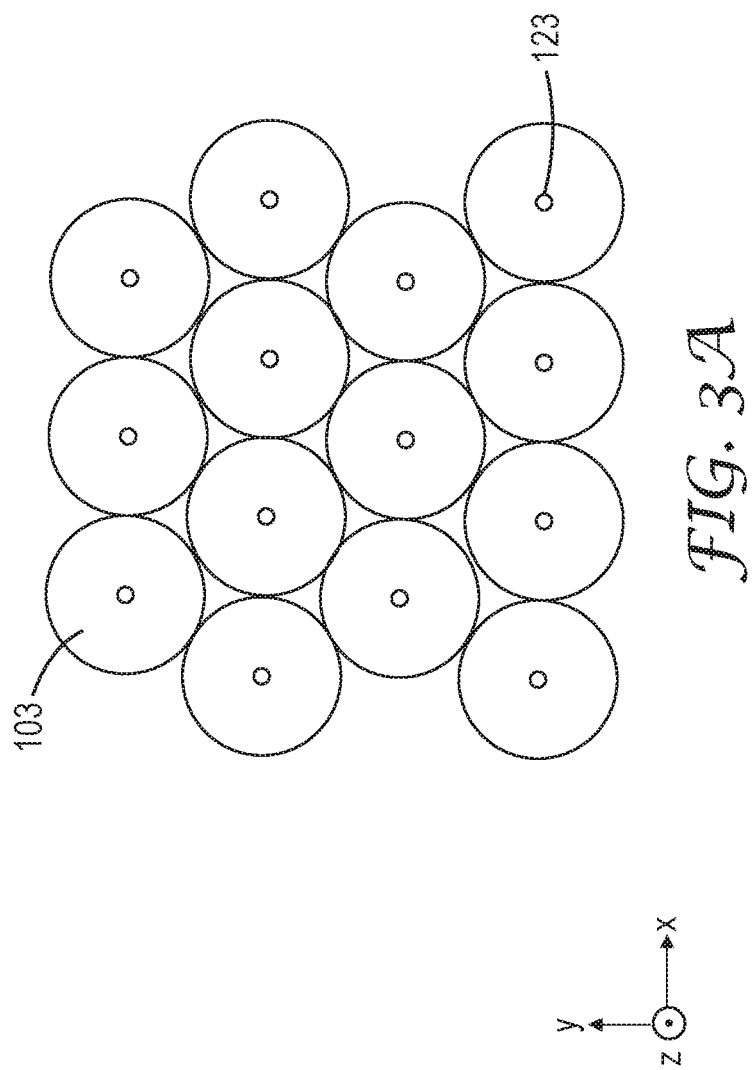
FIGS. 3A-3B are schematic top projected views of optical constructions, according to some embodiments.
Figure 3B:
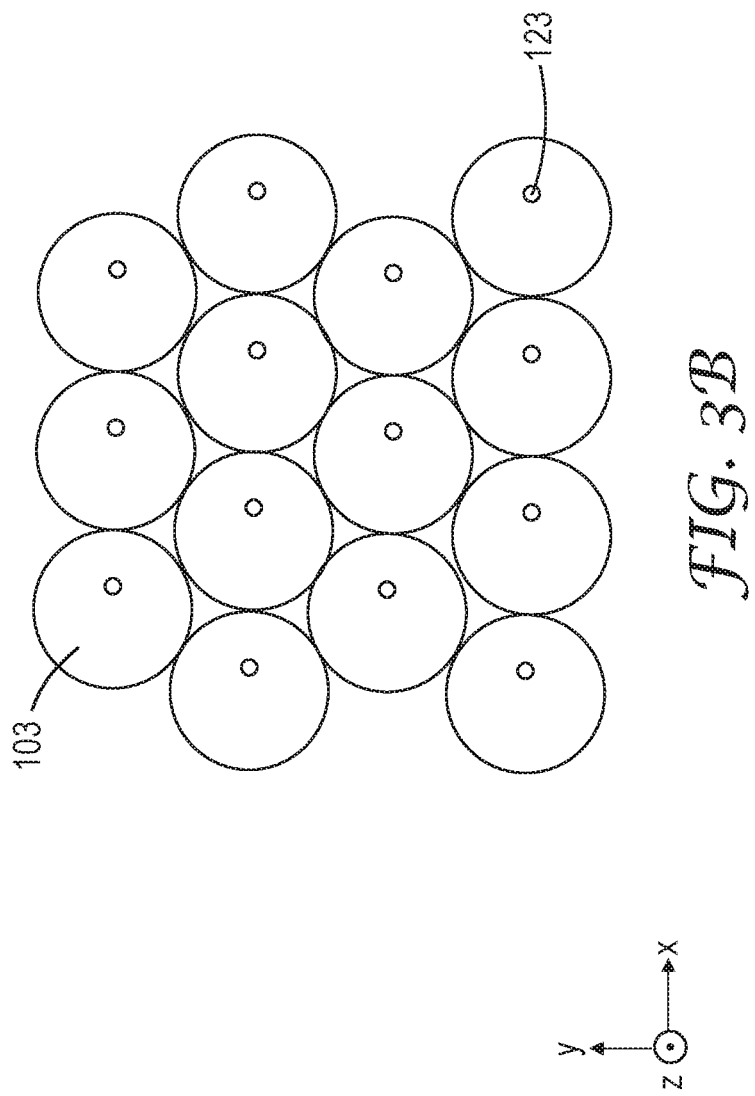

FIGS. 3A-3B are schematic top projected views of optical constructions including pluralities of microlenses 103 and through openings 123, according to some embodiments. The microlenses 103 are arranged along orthogonal first and second directions (e.g., x- and y-directions) and the openings 123 are arranged along the first and second directions. In the embodiment illustrated in FIG. 3A, the microlenses 103 and the openings 123 are centered along straight lines substantially normal to the lens layer (i.e., substantially along the z-direction). In the embodiment illustrated in FIG. 3B, the microlenses 103 and the openings 123 are centered along straight lines making a substantially same oblique angle with the lens layer. The optical construction of FIG. 3A may be adapted to transmit light incident on the optical construction primarily along a thickness direction (z-direction) of the optical construction, while the optical construction of FIG. 3B may be adapted to transmit light incident on the optical construction primarily along a direction making an oblique angle with the thickness direction. In the illustrated embodiments, the microlenses 103 and openings 123 are on a regular triangular array. Other patterns are also possible (e.g., square or rectangular array, other periodic arrays, or irregular patterns).

Figure 4B:
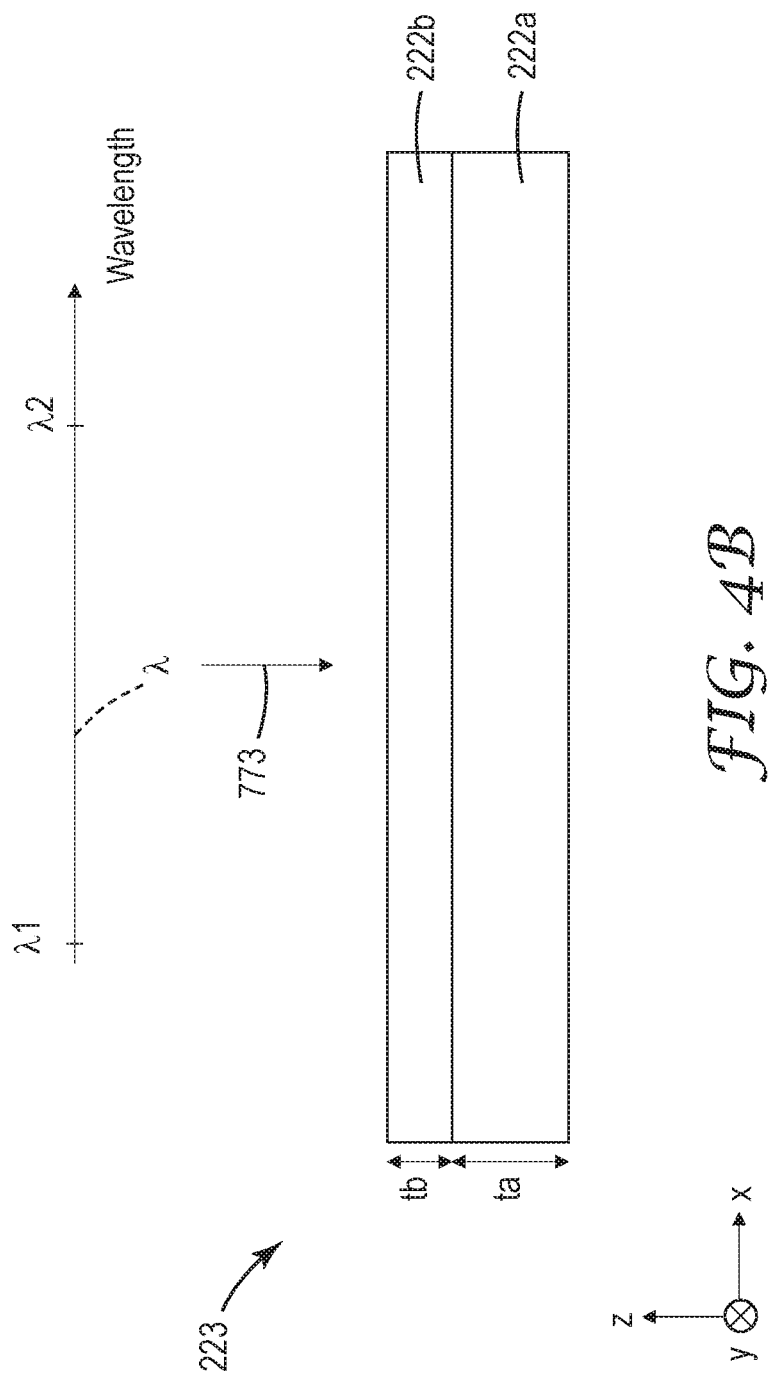

FIGS. 4A-4B are schematic illustrations of multilayer masks 222 and 223, according to some embodiments. Either of the multilayer masks 222 and 223 may correspond to multilayer mask 120. Each of the multilayer masks 222 and 223 includes first and second mask layers 222a and 222b having average thicknesses ta and tb. In some embodiments, the first mask layer 222a is disposed between the lens film 110 and the second mask layer 222b. In some embodiments, the second mask layer 222b is disposed between the lens film 110 and the first mask layer 222a. In some embodiments, the second mask layer 222b is thinner than the first mask layer 222a. In some embodiments, the first mask layer 222a is thicker than the second mask layer 222b and the optical density of the second mask layer 222b is greater than the optical density of the first mask layer 222a. For example, the second mask layer 222b can be a relatively thin layer with a relatively high optical density formed by layer-by-layer deposition and the first mask layer 222a can be a relatively thick layer with a relatively low optical density (e.g., due to relatively low concentration of optically absorptive material) formed by solvent deposition, for example. In some embodiments, tb is less than about 0.5 ta, or less than about 0.25 ta, or less than about 0.2 ta, or less than about 0.15 ta, or less than 0.1 ta. In some such embodiments, or in other embodiments, tb is greater than about 50 nm and tb is less than about 10 microns. In some embodiments, the first mask layer 222a is or includes a solvent-deposited mask layer. In some such embodiments, or in other embodiments, the second mask layer 222b includes first and second materials (e.g., polymer and nanoparticles) including respective first and second binding groups where the first and second binding groups have complementary interactions (e.g., oppositely charged functional groups). Such a layer can be deposited via layer-by-layer self-assembly as described further elsewhere herein.

A multilayer mask or a mask layer can be characterized by its optical density which can be expressed as the minus base 10 logarithm of [transmittance/100%], where the transmittance is the average transmittance over at least a wavelength range of 400 nm to 600 nm for unpolarized normally incident light (incident between though openings) unless indicated differently. The wavelength range may be from 400 nm to 700 nm, or 400 to 800, or 400 to 900, or 400 nm to 1100 nm, for example. (Transmittance can be measured for light incident from either direction). The multilayer mask 120, 222, or 224 can have an optical density of greater than about 2, or greater than about 2.5, or greater than about 2.8, or greater than about 3, for example. Each of the first and second mask layers can have an optical density of greater than about 0.3, or greater than about 0.4, or greater than about 0.5, for example.

In some embodiments, at least one of the first and second mask layers 222a or 222b absorbs at least 30%, or at least about 50%, or at least about 70%, or at least about 80% of substantially normally incident light for at least one wavelength $\lambda$ in a range of $\lambda 1$ to $\lambda 2$. In some embodiments, $\lambda 1$ is about 400 nm, or about 450 nm and $\lambda 2$ is about 3000 nm, or about 2500 nm, or about 2000 nm, or about 1600 nm, or about 1500 nm, or about 1100 nm, or about 800 nm, or about 700 nm, or about 650 nm, or about 600 nm. In some embodiments, $\lambda 1$ is about 700 nm, or about 750 nm, or about 780 nm, or about 800 nm and $\lambda 2$ is about 3000 nm, or about 2500 nm, or about 2000 nm, or about 1600 nm, or about 1500 nm, or about 1100 nm. In some embodiments, the at least one wavelength includes at least one visible wavelength (e.g., in a range of about 400 nm to about 700 nm) and/or at least one near infrared wavelength (e.g., in a range of about 750 nm to about 3000 nm, or about 800 nm to about 1600 nm, or about 800 nm to about 1100 nm). It is often desired for the mask to absorb in at least a visible light range for typical applications. It may be also desired for the multilayer mask to absorb in the infrared to facilitate laser ablation, for example. The first and second mask layers 222a and 222b can have about the same absorption spectra or can have different absorption spectra as described further elsewhere herein.

Any of the multilayer masks or the mask layers described herein may have a substantially uniform optical density. Substantially uniform optical density refers to optical density that is uniform to a good approximation on a length scale of about 1 micron. For example, each cylindrical region through a mask layer or a multilayer mask between through openings having a diameter of about 1 micron can have an optical density within about 15% or within about 10% or within about 5% of an average optical density of such regions. In some embodiments, a mask layer having a substantially uniform optical density is obtained by using optically absorptive particles (e.g., carbon black particles) having an average diameter substantially smaller than 1 micron (e.g., less than about 300 nm or less than about 250 nm) and substantially uniformly dispersed in the layer at a loading sufficiently high that an average center to center spacing between the particles is less than about 1 micron.

Figure 5A:
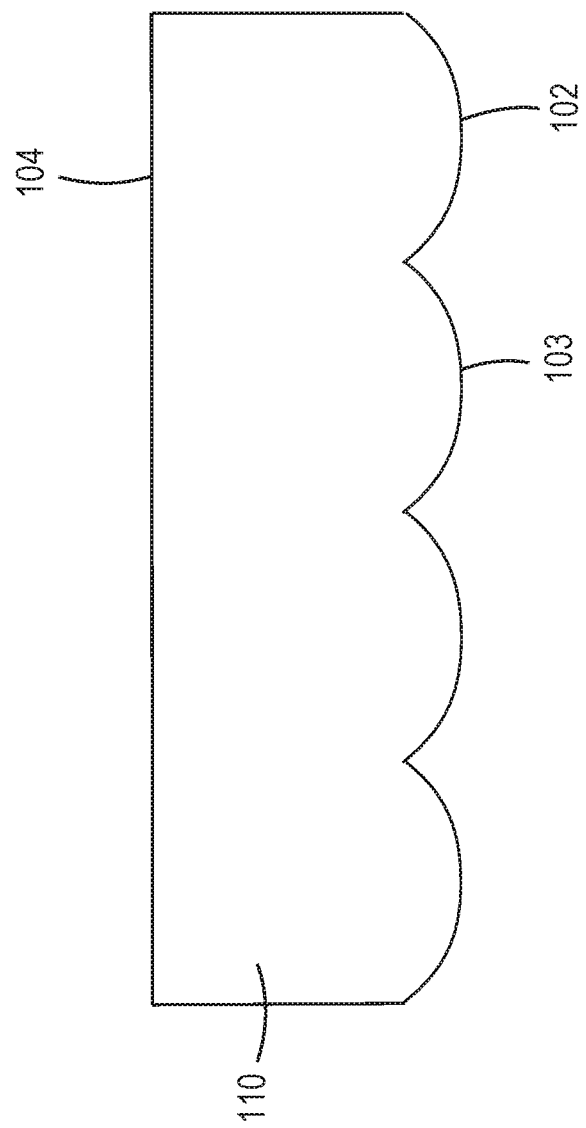
Figure 5D:
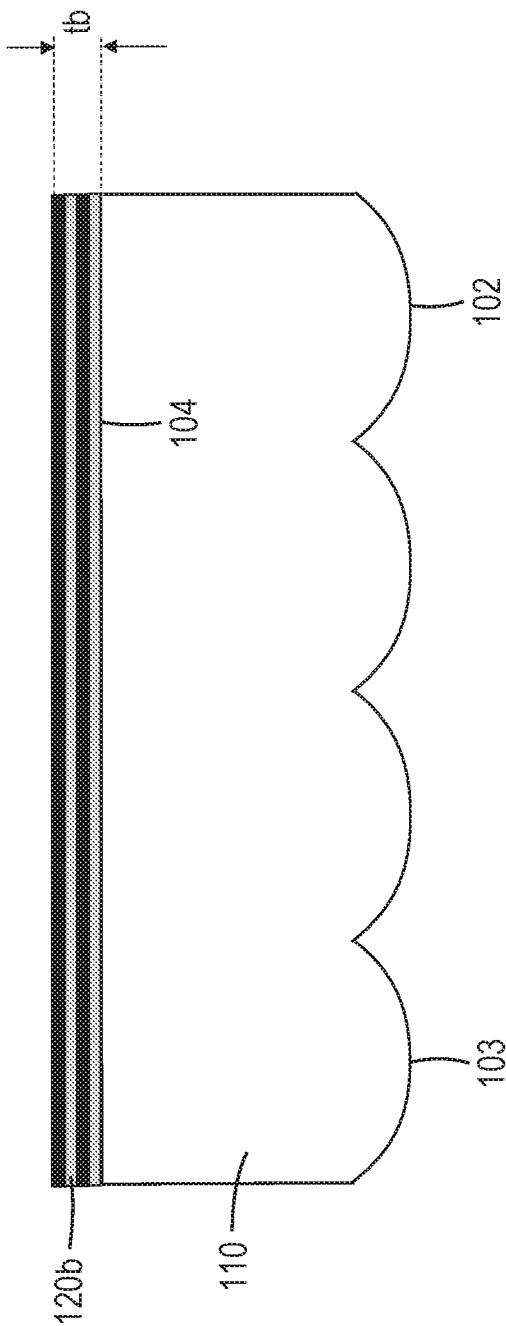
FIG. 5D is a schematic cross-sectional view of a mask layer deposited on a lens film via layer-by-layer self-assembly.
Figure 5E:
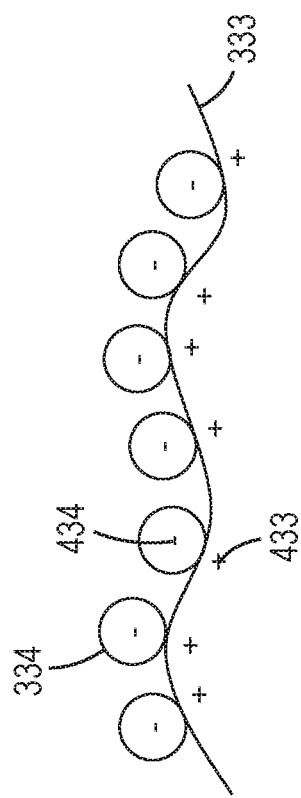
FIG. 5E is a schematic illustration of a bilayer.
Figure 5F:
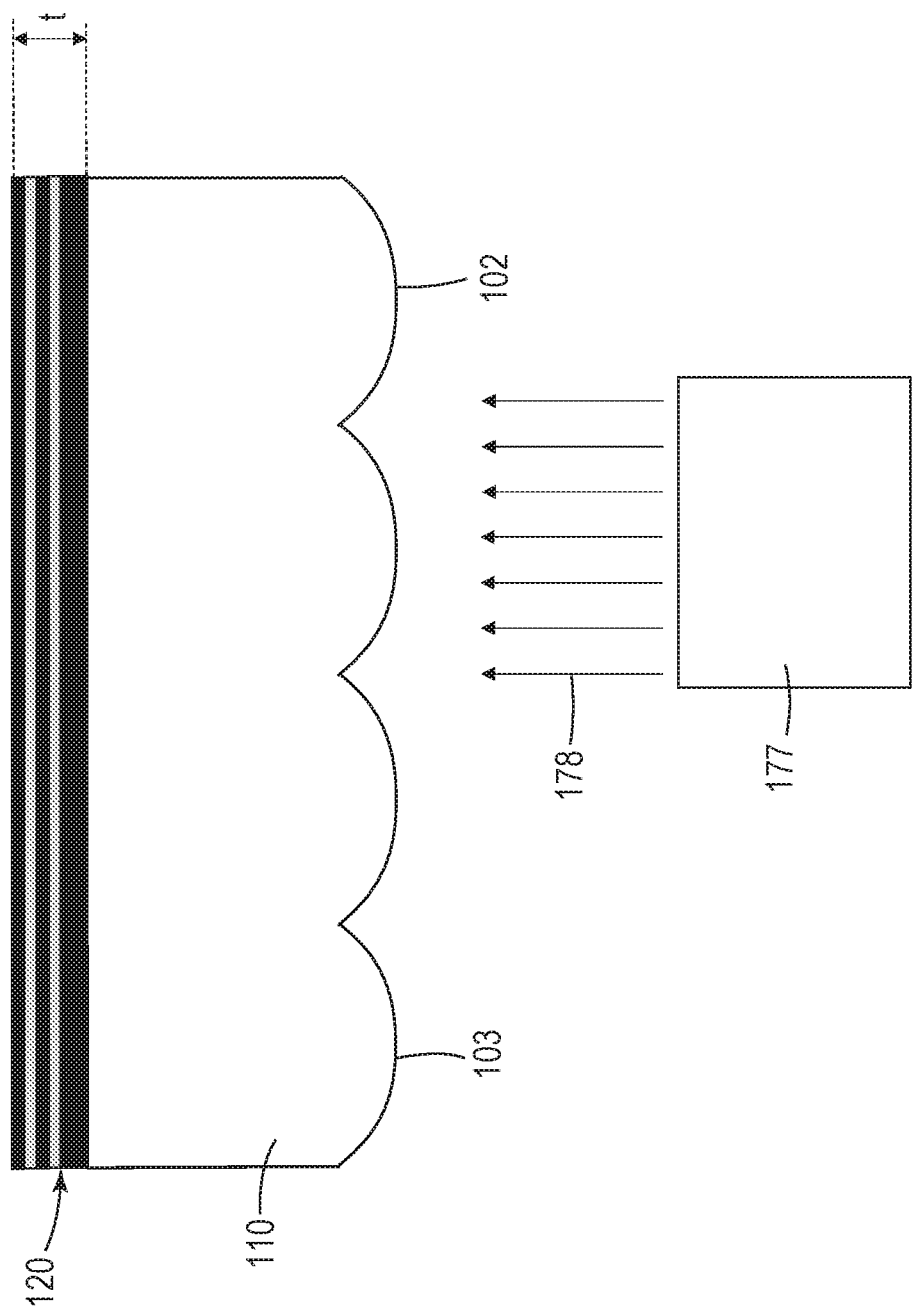
FIG. 5F is a schematic illustration of laser ablation of a multilayer mask through a lens film.

FIGS. 5A-5F schematically illustrate methods for making optical constructions, according to some embodiments. A method includes providing a lens film 110 (see, e.g., FIG. 5A) including an outermost structured first major surface 102 and an opposing outermost substantially planar second major surface 104, where the structured first major surface 102 includes a plurality of microlenses 103 arranged along orthogonal first and second directions; coating (see, e.g., FIG. 5B) the second major surface of the lens film with a mixture 150 of solvent 151, polymer 152, and optically absorptive material 153; drying (see, e.g., FIGS. 5B-5C) the coated mixture to form a first mask layer 120a having an average thickness to (e.g., of less than about 10 microns) and an (e.g., substantially uniform) optical density of greater than about 0.3 or in any range described elsewhere herein. Alternatively, a first mask layer could be formed by coating a resin filled with optically absorptive material and curing the resin. The method can further include depositing a second mask layer 120b having an average thickness to (e.g., of less than about 10 microns) and an (e.g., substantially uniform) optical density of greater than about 0.3 or in any range described elsewhere. The second mask layer 120b can be deposited directly on the second major surface 104 as schematically illustrated in FIG. 5D followed by depositing the first mask layer 120a on the second mask layer 120b, or the second mask layer 120b can be deposited on the first mask layer 120a as schematically illustrated in FIG. 5F. The first and second mask layers 120a and 120b define a multilayer mask 120 having a combined average thickness t which may be less than about 10 microns or less than about 0.5 times an average focal length f of the microlenses 103 or may be in any range described elsewhere herein.

The first mask layer 120a may be a solvent deposited mask layer. In some such embodiments, the first mask layer 120a can include optically absorptive material, such as carbon black particles, dispersed in a thermoplastic polymer. Related solvent-deposited mask layers are described in U.S. Pat. Appl. No. 63/040,056 titled "Optical Construction Including Lens Film and Mask Layer" and filed on Jun. 17, 2020.

Various polymer systems can act as carrier resins (the resin that is to be solvent-deposited) in solvent systems. Nitrocellulose and cellulose esters, for example, are a useful class of polymers. Medium to high molecular weight hydroxyl-functional, partially hydrolyzed, vinyl-chloride vinyl-acetate copolymer can also be used as carrier resins. For alcohol rich solvent systems, polyvinylbutyral may be useful or preferred. Polyamides, ethylcellulose, cellulose acetate propionate, cellulose acetate butyrate, polyurethane, maleic resins, epoxy resins, acrylic, vinyl acrylic may also be useful or preferred based on the solvent mix, substrate choice, degree of adhesion desired, etc. Suitable cellulose esters are available from Eastman Chemical company, for example. Suitable polyurethanes are available under the VERSAMID PUR tradename, for example. Suitable polyvinylbutyral polymers are available under the tradename MOWITAL from Kuraray America, for example. Suitable acrylate co-polymers are available under the tradename PARALOID from Dow Chemical company, for example. Some other polymers that may be useful in some cases include polyurethanes with silanes or silsesquioxanes. Other polymers which can be dissolved or dispersed in a solvent system and can form a film post-drying may also be used.

Suitable solvents include alcohols, ketones, esters, hydrocarbons, glycols, glycol ethers, and glycol esters. Some of these solvents can be high boiling and may be present in small amounts in the coating solution. High boiling hydrocarbons and petroleum naptha and aromatics can optionally also be present in small amounts. Though typically not intentionally added, small amounts of water or moisture can be present in some polar solvents. Nitriles, aminoethanols, amines can also be used as a co-solvent. The preferred solvent may be determined by resin choice as well as process type and conditions (e.g., temperature). Typical preferred solvents include ketones and low boiling alcohols.

The second mask layer 120b may include first and second materials (e.g., oppositely charged nanoparticles and polymer) including respective first and second binding groups where the first and second binding groups have complementary interactions. The second mask layer 120b may be deposited by layer-by-layer (LbL) self-assembly. Layer-by-layer self-assembly is known in the art and may include layer-by-layer spray deposition as described in U.S. Pat. No. 8,234,998 (Krogman et al.) or any of the layer-by-layer deposition techniques described in International Appl. Pub. No. WO 2019/0186397 (Schmidt et al.), for example. The LbL process is commonly used to assemble thin films or coatings of oppositely charged polyelectrolytes electrostatically, but other functionalities such as hydrogen bond donor/acceptors, metal ions/ligands, and covalent bonding moieties can also be the driving force for film assembly. Typically, this deposition process involves exposing the substrate having a surface charge, to a series of liquid solutions. This can be accomplished by immersion of the substrate into liquid baths (also referred to as dip coating), spraying, spin coating, roll coating, inkjet printing, for example. Exposure to the first polyion liquid solution, in which the polyion has charge opposite that of the substrate, results in charged species near the substrate surface adsorbing quickly, establishing a concentration gradient, and drawing more polyelectrolyte from the bulk solution to the surface. Further adsorption occurs until a sufficient layer has developed to mask the underlying charge and reverse the net charge of the substrate surface. The substrate is then exposed to one or more water rinse steps to remove any physically entangled or loosely bound polyelectrolyte. Following the rinse, the substrate is then exposed to a second polyion liquid solution, in which the polyion has charge opposite that of the first polyion. Once again, adsorption occurs, since the surface charge of the substrate is opposite that of the polyion in the second liquid solution. Continued exposure to the second polyion liquid solution then results in a reversal of the surface charge of the substrate. A subsequent rinsing can be performed to complete the cycle. This sequence of steps is said to build up one layer pair, also referred to as a "bilayer" of deposition and can be repeated as desired to add further layer pairs to the substrate. A polycation layer can include polycationic polymers or nanoparticles. Similarly, a polyanion layer can include polyanionic polymers or nanoparticles.

In some embodiments, the first and second binding groups have complementary interactions. The complementary interactions can be complementary electrostatic interactions or complementary hydrogen bonding interactions between hydrogen bond donors and hydrogen bond acceptors. Polymers, nanoparticles, and small molecules can be referred to as "polyionic" or "polyion" or, specifically, "polyanionic", "polyanion", "polycation" or "polycationic," if they contain a plurality of negative or positive ionic charged sites, respectively.

In some embodiments, at least one of the first material or the second material includes a polyelectrolyte. For example, in certain embodiments the first material includes a polyelectrolyte and the second material includes nanoparticles. In some embodiments, the first material includes a polyanion and the second material includes a polycation, while in other embodiments the first material includes a polycation and the second material includes a polyanion. In some embodiments, the polyelectrolyte is a polycation.

In some embodiments, the polycation is a polycationic polymer. Suitable polycationic polymers can include, but are not limited to, polydiallyldimethylammonium chloride (PDAC), linear and branched poly(ethylenimine) (PEI), poly(allylamine hydrochloride) (PAH), polyvinylamine, chitosan, polyaniline, polyamidoamine, poly(vinylbenzyltrimethylamine), and members of the polyquaternium group. In some embodiments, the polyelectrolyte is a polyanionic polymer. Suitable polyanionic polymers include, but are not limited to, sulfonated polystyrene (PSS), poly(vinyl sulfate), poly(vinyl sulfonate), poly(acrylic acid), poly(methacrylic acid), dextran sulfate, heparin, hyaluronic acid, carrageenan, carboxymethylcellulose (CMC), alginate, sulfonated tetrafluoroethylene based fluoropolymers such as NAFION, poly(vinylphosphoric acid), poly(vinylphosphoric acid), and sodium hexametaphosphate. In some embodiments, the polycation is selected from the group consisting of polydiallyldimethylammonium chloride, polyethylenimine, polyallylamine, poly(2-(trimethylamino)ethyl methacrylate, and copolymers thereof.

The polyelectrolyte organic polymers just described can be characterized as polymers with (e.g. repeating) polymerized units that bear an ionic or ionizable group. These groups dissociate in aqueous solutions (water), rendering the polymers charged. Other types of polymers with multiple ionic groups capable of electrostatic interaction are aqueous dispersions of organic polymers. In some embodiments, these polymers also contain polymerized units that bear an ionic or ionizable group. However, the concentration of such groups is significantly lower such that the organic polymers can be dispersed in an aqueous solution, yet do not dissolve forming a solution. Thus, such organic polymers can be characterized as water insoluble. In other embodiments, organic polymers may be rendered water dispersible by use of ionic surfactants. Examples of commercially available aliphatic acrylic dispersions include cationic acrylic latexes available as the tradenames RAYCAT 65124 and PICASSIAN AC-181. Examples of commercially available aqueous polyurethane dispersion include aliphatic polyether cationic urethane polymer dispersions available as the tradenames SANCURE 20051 (also known as PRINTRI1E DP675); SANCURE 20072 (also known as PRINTRITE DP676); and WITCOBOND UCX-214.

In some embodiments, the aqueous solutions or dispersions further include a "screening agent", an additive that promotes even and reproducible deposition by increasing ionic strength and reducing interparticle electrostatic repulsion. Suitable screening agents include any low molecular weight salts such as halide salts, sulfate salts, nitrate salts, phosphate salts, fluorophosphate salts, and the like. Examples of halide salts include chloride salts such as LiCl, NaCl, KCl, $CaCl_2$, $MgCl_2$, $NH_4Cl$ and the like, bromide salts such as LiBr, NaBr, KBr, $CaBr_2$, $MgBr_2$, and the like, iodide salts such as LiI, NaI, KI, $CaI_2$, $MgI_2$, and the like, and fluoride salts such as, NaF, KF, and the like. Examples of sulfate salts include $Li_2SO_4$, $Na_2SO_4$, $K_2SO_4$, $(NH_4)_2SO_4$, $MgSO_4$, $CoSO_4$, $CuSO_4$, $ZnSO_4$, $SrSO_4$, $Al_2(SO_4)_3$, and $Fe_2(SO_4)_3$. Organic salts such as $(CH_3)_3CCl$, $(C_2H_5)_3CCl$, and the like are also suitable screening agents. Suitable screening agent concentrations can vary with the ionic strength of the salt. In some embodiments, the aqueous solution or dispersion includes (e.g., NaCl) screening agent at a concentration ranging from 0.01 M to 0.2M. The second mask layer may contain trace amounts of screening agent.

FIG. 5E is a schematic illustration of a bilayer including first material 333 and second material 334. The first and second materials 333 and 334 have respective first and second binding groups 433 and 434 where the first and second binding groups 433 and 434 have complementary interactions (opposite charges in the illustrated embodiment). In the embodiment schematically illustrated in FIG. 5E, the first material 333 is cationic polymer and the second material 334 is a plurality of ionic nanoparticles. In other embodiments, the polymer may be ionic, and the nanoparticles may be cationic. A charged nanoparticle can have charge in the body of the nanoparticle or on surface groups or dispersants on the surface of the nanoparticle. Multiple bilayers (e.g., 2 to 20, or 3 to 10) may be deposited to provide a desired optical density. In embodiments where the first material 333 is polymer, the resulting mask layer may be considered to be a polymeric mask layer since the polymer of the bilayer(s) typically extends across at least a length and a width of the mask layer. A layer-by-layer deposition can result in a mask layer having a high density of nanoparticles. In some embodiments, the second mask layer contains at least about 50, or at least about 60, or at least about 70, or at least about 75, or at least about 80 weight percent of the nanoparticles. Useful nanoparticles include those described in International Appl. Pub. No. WO 2019/0186397 (Schmidt et al.), for example. In some embodiments, the nanoparticles include carbon black nanoparticles, metal oxide nanoparticles, or a combination thereof. The nanoparticles can have an average particle diameter (e.g., Dv50) in a range of about 5 nm to about 300 nm, for example.

The method further includes ablating (see, e.g., FIGS. 5F and 1) a plurality of through openings 123 in the multilayer mask 120 (FIG. 5F schematically shows the multilayer mask 120 prior to ablation) using a laser 177 emitting infrared light 178 incident on the structured first major surface 102 of the lens film 110 such that the through openings 123 are arranged along the first and second directions and are aligned to the microlenses 103 in a one-to-one correspondence. The infrared light 178 can have wavelengths in a range of about 1020 nm to about 1100 nm, for example, or any range described elsewhere herein. The infrared light 178 can have a wavelength at a peak intensity of about 1064 nm, for example. The infrared light 178 can have a beam diameter that fills or substantially fills at least one microlens. For example, the microlenses may have an average diameter in a range of 5 to 50 microns and the beam diameter may be in a range of 100 to 500 microns. The optically absorptive material 153 is preferably optically absorptive for the wavelength range of the infrared light 178 as well as for a visible wavelength range (e.g., at least from about 450 nm to about 650 nm). The optically absorptive material 153 includes optically absorptive material 153a and 153b which may have a same or different composition. The optically absorptive material 153 can include one, two, or more optically absorptive pigments and/or dyes that may absorb in different wavelength ranges, for example. The first mask layer 120a (see, e.g., FIG. 5C) may include at least one optically absorptive dye and at least one optically absorptive pigment, for example. The optically absorptive material 153 can be optically absorptive for visible wavelengths and for the infrared light 178 so that the optically absorptive material 153 absorbs the infrared light 178 for ablation to occur and provides the desired optical density for the resulting mask layer. Suitable optically absorptive material 153 includes carbon black. In some embodiments, the optically absorptive material 153 include nanoparticles, such as carbon black or metal oxide nanoparticles.

The through holes can be created using a coherent, pulsed light source (e.g., laser) with wavelengths from 350 nm-1600 nm, or 400 nm-1200 nm, or from 500 nm-1100 nm, or from 1000 nm-1100 nm, or from 1020 nm to 1100 nm. For example, the light source can be a doped fiber laser that produces a near infrared (NIR) band having wavelengths from about 1020 nm to about 1100 nm. A wide range of lasers can be used for the light source. Suitable lasers include Nd:YAG lasers, fiber lasers, and diode lasers, for example. $1^{st}$, $2^{nd}$ or $3^{rd}$ harmonics may be used, for example. The desired wavelength range of the laser may depend on the polymer and optically absorptive material used in the mask layer. Creating apertures in a layer using a laser through a microlens array is generally described in U.S. Pat. App. Publ. No. 2007/0258149 (Gardner et al.), for example.

FIG. 6 is a schematic plot of optical absorption versus wavelength, according to some embodiments. Optical absorption spectra 391 and 392 are illustrated. Absorption versus wavelength curves differing only in overall scale will be considered to be the same absorption spectra, while absorption versus wavelength curves having different wavelength dependence will be considered to be different absorption spectra. In some embodiments, the first and/or second mask layer includes at least first and second optically absorptive materials (e.g., 153a and 153b) where the first and second optically absorptive materials have different optical absorption spectra (e.g., spectra 391 and 392). For example, one of the optically absorptive materials may absorb more strongly in a visible wavelength range while the other of the optically absorptive materials may absorb more strongly in a near infrared wavelength range. In some embodiments, the first and second mask layers have different optical absorption spectra (e.g., spectra 391 and 392). In some embodiments, the different spectra result in a high absorption (e.g., at least about 75% for substantially normally incident light) over wavelength range of at least 400 nm to 1100 nm, for example.

The optical construction 200 can include optional additional elements or layers disposed on the lens film 110 opposite the multilayer mask 120 and/or disposed on the multilayer mask 120 opposite the lens film 110. For example, a low index layer can be disposed on the lens film 110 or the lens film 110 can include optical decoupling structures, and/or a wavelength-selective optical filter can be disposed on the multilayer mask 120 opposite the lens film 110. Examples of such layers or structures can be found in International Appl. Pub. No. WO 2020/035768 (Yang et al.), for example.

In some embodiments, the microlens layer is bonded to a display panel or other component through a low index layer. In some embodiments, the low index layer has a refractive index of no more than 1.3 (e.g., in a range of 1.1 to 1.3) and is disposed on and has a major surface substantially conforming to the first major surface 102 of the lens film 110. Refractive index refers to the refractive index at 633 nm unless indicated otherwise. Layers having a refractive index of no more than 1.3 may be nanovoided layers as described in U.S. Pat. Appl. Publ. Nos. 2013/0011608 (Wolk et al.) and 2013/0235614 (Wolk et al.), for example.

In some embodiments, the lens film 110 further includes optical decoupling structures which may be disposed between adjacent microlenses. The optical decoupling structures can be any objects which protrude beyond the microlenses for attachment to an adjacent layer such that the adjacent layer does not contact the microlenses. The optical decoupling structures can be cylindrical posts or can be posts having a non-circular cross-section (e.g., rectangular, square, elliptical, or triangular cross-section). The optical decoupling structures can have a constant cross-section, or the cross-section can vary in the thickness direction (e.g., the optical decoupling structures can be posts which are tapered to be thinner near the top of the posts). In some embodiments, the optical decoupling structures have a tapered elliptical cross-section. For example, the optical decoupling structures can have any of the geometries of the optical decoupling structures described in International Appl. Pub. No. WO 2019/135190 (Pham et al.). In some embodiments, the optical decoupling structures extend from a base of the array of microlenses. In some embodiments, at least some optical decoupling structures are disposed on top of at least some of the microlenses. Related optical constructions including optical decoupling structures are described in International Appl. Pub. No. WO 2020/035768 (Yang et al.) and in U.S. Appl. No. 62/944,676 filed Dec. 6, 2019 and titled "Optical Layer and Optical System".

EXAMPLES

Unless otherwise noted, all parts, percentages, and ratios reported in the following examples are on a weight basis.
Materials

| Name | Description | Supplier |
|---|---|---|
| CAP 504-0.2 | Cellulose acetate propionate | Eastman Chemical Company (Kingsport, Tennessee) |
| DOWANOL PM | Propylene glycol methyl ether | Dow Chemical (Midland, Michigan) |
| X55 | ORASOL Black X55, absorbing dye | BASF (Florham Park, New Jersey) |
| SC20072 | SANCURE 20072 cationic polyurethane dispersion | Lubrizol (Cleveland, Ohio) |
| EXPCB | Anionic, surface-modified carbon black nanoparticles | Cabot Corporation (Boston, Massachusetts) |
| NaCl | Sodium chloride | Sigma-Aldrich Co. (St. Louis, Missouri) |
| PL92 | Pluronic L92, non-ionic surfactant | BASF (Florham Park, New Jersey) |
| EBECRYL 4396 | Isocyanate aliphatic functional urethane acrylate | Allnex USA (Alpharetta, Georgia) |
| IRGACURE 819 | Photoinitiator | BASF (Florham Park, New Jersey) |

Various solvents, reagents, etc. not listed in the above table are available from Sigma-Aldrich Co. (St. Louis, Missouri).
IR Dispersion 1

IR Dispersion 1 was a dispersion of potassium tungsten oxide nanoparticles made by the process described in Comparative Example B (CE-B) of International Appl. Pub. No. WO 2020/016755 (Sharma et al.).
Coating Solution 1

5.84 gm of 16 wt % CAP-504-0.2 solution in DOWANOL PM:MEK blend (40:60 weight) was combined with 2.8 gm of IR Dispersion 1 (40 wt % solution in DOWANOL PM) and 0.44 gm of ORASOL Black X55. 1 gm of methyl ethyl ketone (MEK) and 1 gm of DOWANOL PM was further added and the resulting mixture was homogenized using a vortex mixer.
Coating Solution 2

53 gm of 17.3 wt % CAP-504-0.2 solution in DOWANOL PM:MEK blend (60:40 weight) was combined with 28 gm of IR Dispersion 1 (40 wt % solution in DOWANOL PM) and 4.8 gm of ORASOL Black X55 dissolved in 10.8 gm MEK. 27.4 gm of methyl ethyl ketone (MEK) and 2.2 gm of DOWANOL PM was further added and the resulting mixture was homogenized using a vortex mixer.

Coating Solution 3 (LbL Coating Solution)

Coating Solution 3 was made by diluting SC20072 from 27 wt % solids to 1 wt % solids with deionized (DI) water after adding NaCl to a concentration of 200 mM. EXPCB coating solution was made by diluting EXPCB from 30 wt % solids to 1.0 wt % solids with DI waterafter adding NaCl to a concentration of 50 mM. PL92 was added to each coating solution to a concentration of 0.1 wt %. Coatings solutions were made up in quantities of 1 kg each.
Method for Making Spray Layer-by-Layer (LbL) Self-Assembled Coatings Layer-by-layer self-assembled coatings were made using an apparatus purchased from Svaya Nanotechnologies, Inc. (Sunnyvale, CA) and modeled after the system described in U.S. Pat. No. 8,234,998 (Krogman et al.) as well as Krogman et al., "Automated Process for Improved Uniformity and Versatility of Layer-by-Layer Deposition", Langmuir 2007, 23, 3137-3141 The apparatus included pressure vessels loaded with the coating solutions. Spray nozzles with a flat spray pattern (from Spraying Systems, Inc., Wheaton, Illinois) were mounted to spray the coating solutions and rinse water at specified times, controlled by solenoid valves. The pressure vessels (Alloy Products Corp., Waukesha, WI) containing the coating solutions were pressurized with nitrogen to 30 psi, while the pressure vessel containing deionized (DI) water was pressurized with air to 30 psi. Flow rates from the coating solution nozzles were each 10 gallons per hour, while flow rate from the DI water rinse nozzles were 40 gallons per hour. The substrate to be coated (9"×10") was adhered at the edges with epoxy (Scotch-Weld epoxy adhesive, DP100 Clear, 3M Company, St. Paul, MN) to a glass plate (12"×12"×⅛" thick) (Brin Northwestern Glass Co., Minneapolis, MN), which was mounted on a vertical translation stage and held in place with a vacuum chuck. In a typical coating sequence, the polycation solution (Coating Solution 3) was sprayed onto the substrate while the stage moved vertically downward at 76 mm/sec. Next, after a dwell time of 12 sec, the DI water was sprayed onto the substrate while the stage moved vertically upward at 102 mm/sec. The substrate was then dried with an airknife at a speed of 3 mm/sec. Next, the polyanion (EXPCB carbon black nanoparticles) solution was sprayed onto the substrate while the stage moved vertically downward at 76 mm/sec. Another dwell period of 12 sec was allowed to elapse. The DI water was sprayed onto the substrate while the stage moved vertically upward at 102 mm/sec. Finally, the substrate was then dried with an airknife at a speed of 3 mm/sec. The above sequence was repeated to deposit a number of bilayers denoted as (Polycation/Polyanion)$_n$ where n is the number of bilayers. The coated substrate (e.g. polymer film) was stripped off of the glass prior to subsequent processing. The coating on the glass was retained for thickness, light transmission, and surface resistivity measurements.

Examples 1-2

A lens film was made by casting an acrylate resin onto a polyethylene terephthalate (PET) substrate and curing the resin in contact with a replication tool to form a hexagonal array of 20 micron diameter microlenses. A first mask layer was formed as follows: Coating Solution 1 was coated using a Meyer rod #10 on the side of the PET substrate opposite the microlenses. The coating was dried for 5 min in a hot air oven drying at 70 deg. C. A second mask layer was deposited as described under "Method for Making Spray Layer-by-Layer (LbL) Self-Assembled Coatings". Three (Example 1)

or six (Example 2) bilayers were deposited where each bilayer consisted of an anionic carbon black layer and a cationic polymer layer.

Through holes in the resulting multilayer mask were formed via laser ablation through the microlenses. A 40 W pulsed fiber laser (SPI Lasers, UK) operating at a wavelength of 1070 nm was used with the following parameters: Scanning speed: 2 m/s; Distance between lines: 100 microns; Pulse length: 250 ns; Repetition rate: 20 kHz; and Laser power: 15%-25%. An intense and high-quality beam was generated by the laser. The fiber laser was protected from back reflection with a Faraday isolator mounted at the end of the beam delivery fiber. The laser beam diameter after passing through a beam expander was approximately 10 mm. The beam was directed to a commercially available laser scanner head (hurrySCAN III 14) acquired from SCANLAB AG (Germany) with a dielectric mirror. After being reflected down by a pair of galvo-mirrors the beam was finally focused by an F-Theta telecentric focusing lens. A 167 mm focal length focusing lens was used in the ablation experiments. The scanner was mounted to a manual Z-stage to control position in the Z direction.

Examples 3-4

Examples 3-4 were prepared as described for Examples 1-2, respectively, except that the second mask layer (the LbL deposited mask layer) was deposited on the side of the PET substrate opposite the microlenses and then the first mask layer (the solvent-deposited mask layer) was deposited on the second mask layer.

Examples 5-6

The Coating Solution 2 was delivered at flow rates of 43.3 cc/min through a Zenith BPB pump with a pump rate of 1.168 cc/rev to a slot coating die for 6" wide coating on the backside of a 9" wide 0.92 mil thick clear PET film with 20 micron microlens features. The dry coating thickness at the line speed of 30 ft/min based on the above flow rate was estimated to be around 3 micron. After the solution was coated, the coated web first passed through a 10 ft long 2-zone gap dryer to minimize the airflow induced mottle defect. Both gap dryer zones were left at ambient temperature. A 3-zone air flotation oven equipped with top and bottom air bars was followed immediately after the gap dryer to dry off all the volatile solvent and cool down the coating temperature in the last zone. Each dryer zone was about 2 meter long. The temperature of zone 1, zone 2 and zone 3 were set at 150, 175 and 200 F respectively. The optical density of this coating measured using a X-Rite Gretag Macbeth D200-II 36.51.03 Transmission Densitometer was 2.2. A second mask layer was deposited as described under "Method for Making Spray Layer-by-Layer (LbL) Self-Assembled Coatings". Three (Example 5) or six (Example 6) bilayers were deposited where each bilayer consisted of an anionic carbon black layer and a cationic polymer layer. The optical density of the final coating after LBL deposition measured using a X-Rite Gretag Macbeth D200-II 36.51.03 Transmission Densitometer was 3.0 and 3.9 for Examples 5 and 6, respectively.

Through holes in the resulting multilayer mask were formed via laser ablation through the microlenses as generally described for Examples 1-2 except that the 40 W pulsed fiber laser (SPI Lasers, UK) operating at a wavelength of 1070 nm was used with the following parameters: Scanning speed: 2 m/s; Distance between lines: 70 microns; Pulse length: 30 ns; Repetition rate: 30 kHz; and Laser power: 15%-25%. The focal spot was adjusted a few mm above the sample to optimize the laser ablation.

Comparative Example C1

Comparative Example C1 was prepared as described for Examples 1-2 except that the second mask layer (the LbL deposited mask layer) was omitted.

Comparative Example C2

Comparative Example C2 was prepared as described for Examples 5-6 except that the second mask layer (the LbL deposited mask layer) was omitted. The optical density of this coatings was measured using a X-Rite Gretag Macbeth D200-II 36.51.03 Transmission Densitometer was 2.2.

Comparative Example C3-C4

Comparative Example C3-C4 was prepared by LBL coating only three bilayers (C3) and six bilayers (C4). No other mask layer was deposited. The optical density of the LBL only coatings was measured using a X-Rite Gretag Macbeth D200-II 36.51.03 Transmission Densitometer was 0.74 and 1.64 for Comparative Examples C3 and C4, respectively.

Comparative Example C5

A mask layer was formed from an ultraviolet (UV) curable formulation containing 15 parts carbon black, 60 parts isobornyl acrylate, 25 parts EBECRYL 4396 and 3 parts IRGACURE 819 as follows. This UV curable 100% solids formulation was coated on the planar side of a lens film as described for Examples 1-2. The conditions were designed so that the thickness of the coating was around 5 microns. The coating was cured using medium pressure mercury UV "D type" light source. Through holes were laser ablated through the resulting mask layer generally as described for Examples 1-2.

Figure 7:
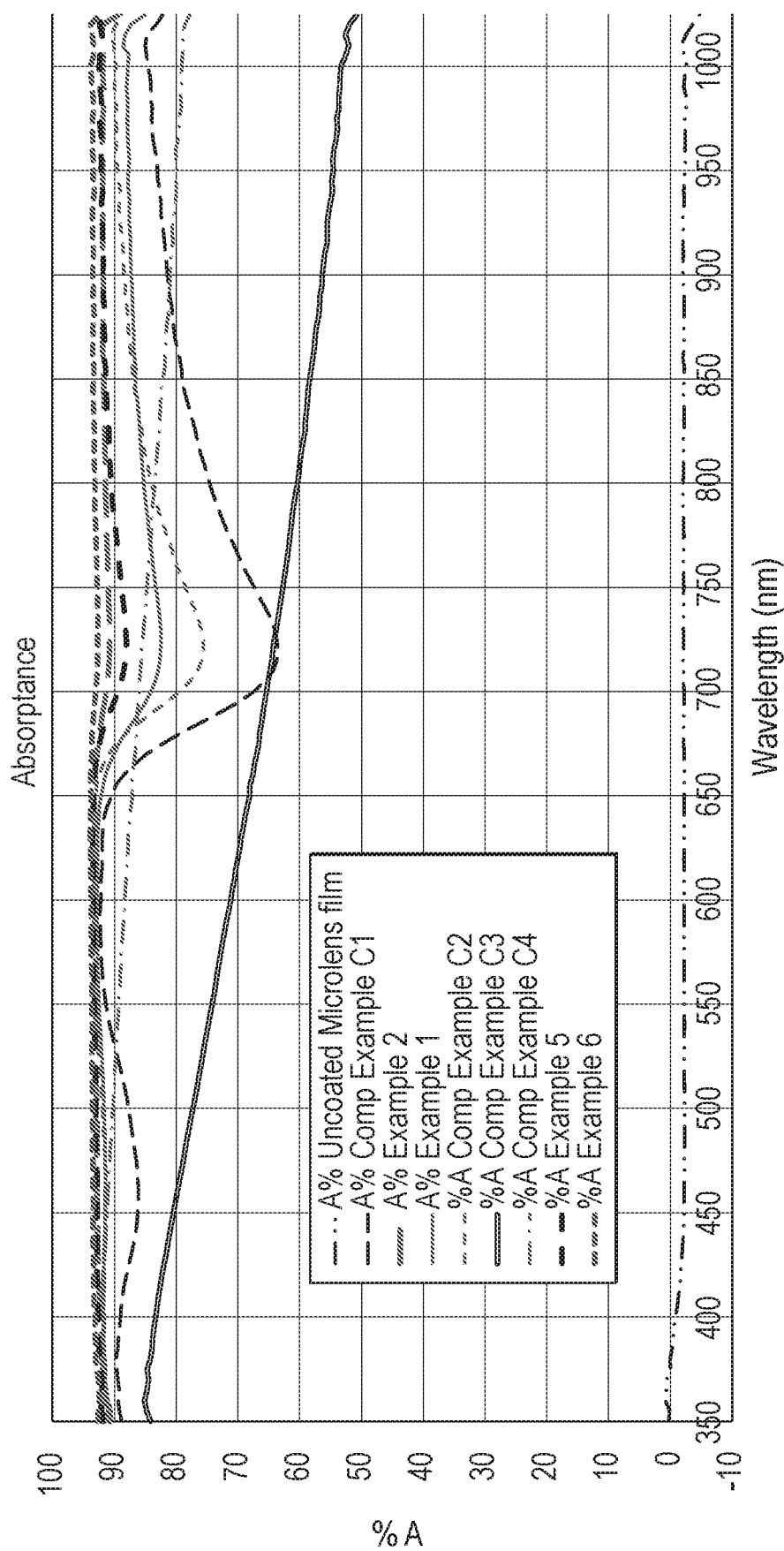
FIG. 7 is a plot of absorptance versus wavelengths for various masks.

The absorptance of the mask layers of various samples were determined by first measuring transmission and reflectance curves using a HunterLab spectrometer (Hunter Associates Laboratory, Reston, VA) and using the results to calculate absorptance as 100%–transmission–reflectance. FIG. 7 is a plot of the resulting absorptance versus wavelength. Negative values of absorptance are a result of measurement error for samples having an absorptance close to zero. The absorptance was measured prior to laser ablation.

Figure 8:
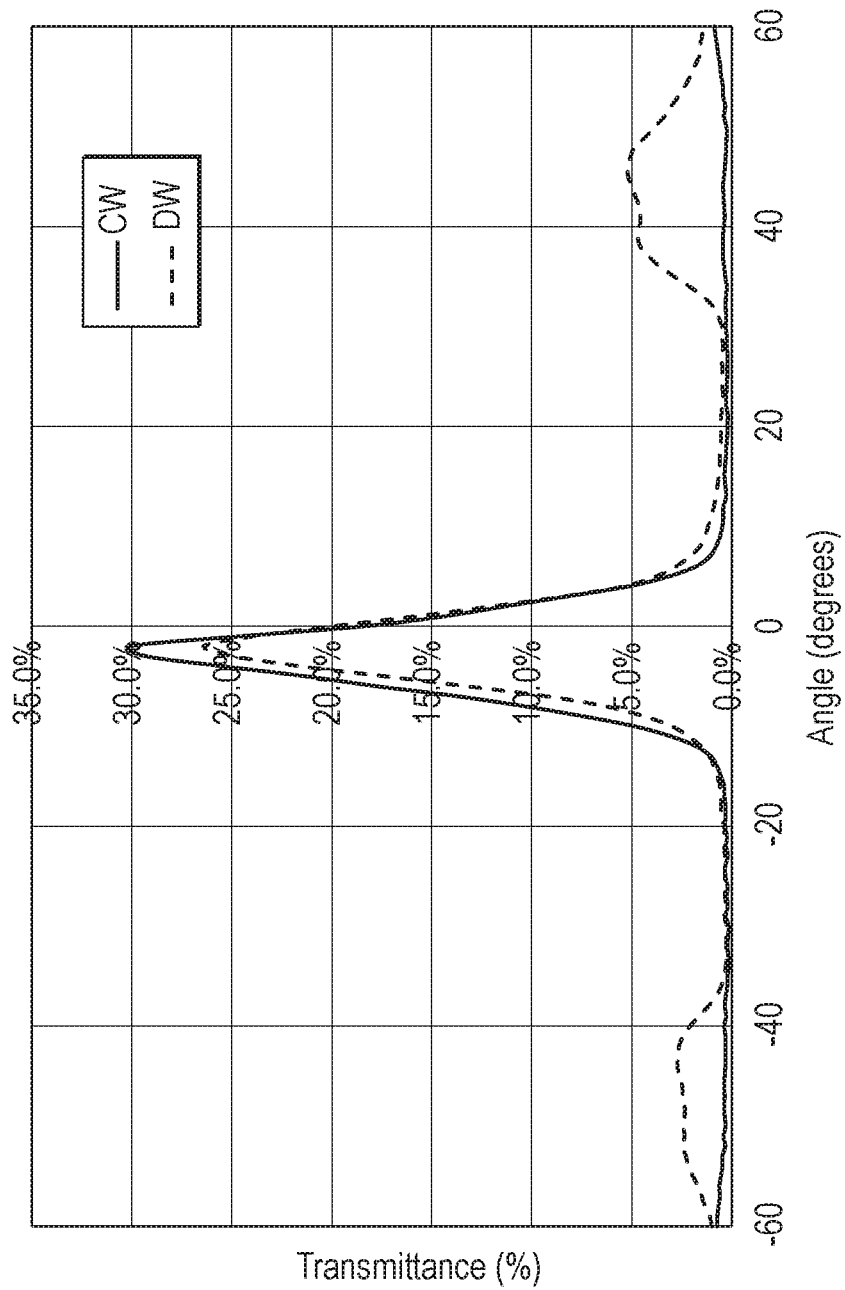
FIG. 8 is a plot of optical transmittance versus incident angle for a comparative optical construction.

Angular transmittance of various samples were measured after laser ablation on a customized goniometer system that included a collimated light source and a silicon detector. The light source was a green LED with 530 nm emission wavelength attached to a collimation lens, both from Thorlabs. The light source was stationary and had a fixed illumination angle. The silicon detector had a light-sensitive area of 20 mm×20 mm and was also obtained from Thorlabs. After the microlens sample was clamped to the silicon detector, it rotated with the silicon detector along two orthogonal axes, and the optical transmittance of the sample was calculated based on the measured power transmission. Results are shown in FIG. 8 for Comparative Example C5 and in FIG. 9 for Example 5. For Comparative Example C5, the peak transmittance T1 divided by the full width at 20% maximum W1 was 2.27%/degree in the cross-web (CW) direction and 2.09%/degree in the down-web (DW) direction. For Example 5, the peak transmittance T1 divided by the full width at 20% maximum W1 was 3.57%/degree in the cross-web (CW) direction and 2.50%/degree in the down-web (DW) direction.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical construction comprising:
   a lens film comprising an outermost structured first major surface and an opposing outermost substantially planar second major surface, the structured first major surface comprising a plurality of microlenses arranged along orthogonal first and second directions; and
   a polymeric multilayer mask disposed on the second major surface of the lens film, the multilayer mask having an average thickness of less than about 0.5 times an average focal length of the microlenses and an optical density of greater than about 2, the multilayer mask comprising polymeric first and second mask layers, each of the first and second mask layers having an optical density of greater than about 0.3, the multilayer mask defining a plurality of laser-ablated through openings therein arranged along the first and second directions, the through openings aligned to the microlenses in a one-to-one correspondence, such that for substantially collimated light incident on the structured first major surface side of the optical construction along an incident direction forming an incident angle with the second major surface, an optical transmittance of the optical construction as a function of the incident angle comprises a first transmitted peak having a first peak transmittance T1 and a corresponding full width at 20 percent of maximum W1, T1/W1≥2.4%/degree.

2. The optical construction of claim 1, wherein the second mask layer comprises first and second materials comprising respective first and second binding groups, the first and second binding groups having complementary interactions.

3. The optical construction of claim 1, wherein the first mask layer comprises a solvent-deposited mask layer.

4. The optical construction of claim 1, wherein the first mask layer is disposed between the lens film and the second mask layer.

5. The optical construction of claim 1, wherein the second mask layer is disposed between the lens film and the first mask layer.

6. The optical construction of claim 1, wherein the first and second mask layers have respective first and second average thickness ta and tb, tb less than about 0.5 ta.

7. The optical construction of claim 1, wherein the optical transmittance of the optical construction further comprises a second transmitted peak having a second peak transmittance T2, the second transmitted peak being the largest transmitted peak for incident angles greater than an incident angle of the first transmitted peak by at least about 30 degrees and by no more than about 60 degrees, T2≤3%.

8. An optical construction comprising:
   a lens film comprising an outermost structured first major surface and an opposing outermost substantially planar second major surface, the structured first major surface comprising a plurality of microlenses arranged along orthogonal first and second directions; and
   a polymeric multilayer mask disposed on the second major surface of the lens film, the multilayer mask having an average thickness of less than about 0.5 times an average focal length of the microlenses and an optical density of greater than about 2, the multilayer mask comprising polymeric first and second mask layers, each of the first and second mask layers having an optical density of greater than about 0.3, the multilayer mask defining a plurality of laser-ablated through openings therein arranged along the first and second directions, the through openings aligned to the microlenses in a one-to-one correspondence, such that for substantially collimated light incident on the structured first major surface side of the optical construction along an incident direction forming an incident angle with the second major surface, an optical transmittance of the optical construction as a function of the incident angle comprises a first transmitted peak having a first peak transmittance T1 and a second transmitted peak having a second peak transmittance T2, the second transmitted peak being the largest transmitted peak at an incident angle greater than an incident angle of the first transmitted peak by at least about 30 degrees and by no more than about 60 degrees, T2≤3%, T1/T2≥10.

9. The optical construction of claim 8, wherein the optical transmittance has a full width at 20 percent of maximum W1 corresponding to the first transmitted peak of less than about 20 degrees.

10. The optical construction of claim 8, wherein the second mask layer comprises first and second materials comprising respective first and second binding groups, the first and second binding groups having complementary interactions.

11. An optical construction comprising:
    a lens film comprising an outermost structured first major surface and an opposing outermost substantially planar second major surface, the structured first major surface comprising a plurality of microlenses arranged along orthogonal first and second directions; and
    a multilayer mask disposed on the second major surface of the lens film, the multilayer mask having an average thickness of less than about 0.5 times an average focal length of the microlenses and an optical density of greater than about 2, the multilayer mask defining a plurality of laser-ablated through openings therein arranged along the first and second directions, the through openings aligned to the microlenses in a one-to-one correspondence, the multilayer mask comprising a polymeric first mask layer and a second mask layer comprising first and second materials comprising respective first and second binding groups, the first and second binding groups having complementary interactions, each of the first and second mask layers having an optical density of greater than about 0.3.

12. The optical construction of claim 11, wherein the first material comprises charged polymer and the second material comprises oppositely charged nanoparticles, the second mask layer comprising at least about 50 weight percent of the nanoparticles.

13. The optical construction of claim 11, wherein the first mask layer comprises at least first and second optically absorptive materials, the first and second optically absorptive materials having different optical absorption spectra.

14. The optical construction of claim 11, wherein the first and second mask layers have different optical absorption spectra.

* * * * *